United States Patent [19]
Matsumoto

[11] Patent Number: 5,384,758
[45] Date of Patent: Jan. 24, 1995

[54] REPRODUCTION-ONLY MAGNETO-OPTICAL DISK WITH SELECTIVELY EXCHANGE COUPLED LAYERS, AND REPRODUCTION METHOD AND REPRODUCTION APPARATUS THEREFOR

[75] Inventor: Hiroyuki Matsumoto, Tokyo, Japan

[73] Assignee: Nikon Corporation, Tokyo, Japan

[21] Appl. No.: 983,696

[22] Filed: Dec. 1, 1992

[30] Foreign Application Priority Data

Dec. 2, 1991 [JP] Japan .................. 3-317763
May 28, 1992 [JP] Japan .................. 4-136670

[51] Int. Cl.$^6$ .................. G11B 11/10; G11B 13/04
[52] U.S. Cl. .................. 369/13; 369/288; 360/59
[58] Field of Search .................. 369/13, 288, 275.1, 369/275.2, 275.3, 275.4, 275.5, 47, 51, 272, 14; 360/59, 114, 131, 135; 365/122, 27, 10, 22, 32; 428/694, 900

[56] References Cited

U.S. PATENT DOCUMENTS

| | | | |
|---|---|---|---|
| 5,018,119 | 5/1991 | Aratani et al. | 369/13 |
| 5,168,482 | 12/1992 | Aratani et al. | 369/13 |
| 5,235,569 | 8/1993 | Matsumoto et al. | 369/13 |

FOREIGN PATENT DOCUMENTS 0282356  9/1988  European Pat. Off. .
0415449  3/1991  European Pat. Off. .
0465859  1/1992  European Pat. Off. .

OTHER PUBLICATIONS

J. Saito, M. Sato, H. Matsumoto, H. Akasaka, "Direct Overwrite by Light Power Modulation of Magneto-Optical Multi-Layered Media", *Japanese Journal of Applied Physics*, vol. 26, No. 4, 1987, pp. 155–159.
Patent Abstracts of Japan, vol. 16, No. 209, May, 1992; and JP-A-40 34 744, Feb. 1992.

*Primary Examiner*—Ali Neyzari
*Attorney, Agent, or Firm*—Shapiro and Shapiro

[57] ABSTRACT

A reproduction-only magneto-optical disk has first and second magnetic layers. First micro areas $\alpha_0$ where an exchange coupling force acts between the two magnetic layers, and second micro areas $\alpha_1$ where no exchange coupling force acts between the two magnetic layers are formed in the disk. Either or both of the two kinds of micro areas serve as information units, and information is expressed by the presence/absence or length of the information units. The two magnetic layers are exchange-coupled to each other at a temperature not more than Curie Temperatures of the two layers, and directions of magnetization of the magnetic layers can be aligned at room temperature in a state wherein an interface magnetic wall is formed between the two magnetic layers in each first micro area. A disk reproduction method and a reproduction apparatus are also provided.

23 Claims, 10 Drawing Sheets

FIG. 6A

| BINARY CODED INFORMATION | 1 | 0 | 1 | 1 | 0 | 1 | 1 | 0 | 1 | 0 | 1 |
|---|---|---|---|---|---|---|---|---|---|---|---|
| AREAS | $\alpha_1$ | $\alpha_0$ | $\alpha_1$ | $\alpha_1$ | $\alpha_0$ | $\alpha_1$ | $\alpha_1$ | $\alpha_0$ | $\alpha_1$ | $\alpha_0$ | $\alpha_1$ |

1ST LAYER
2ND LAYER
D

FIG. 6B

1ST LAYER
2ND LAYER

FIG. 6C

1ST LAYER
2ND LAYER
W

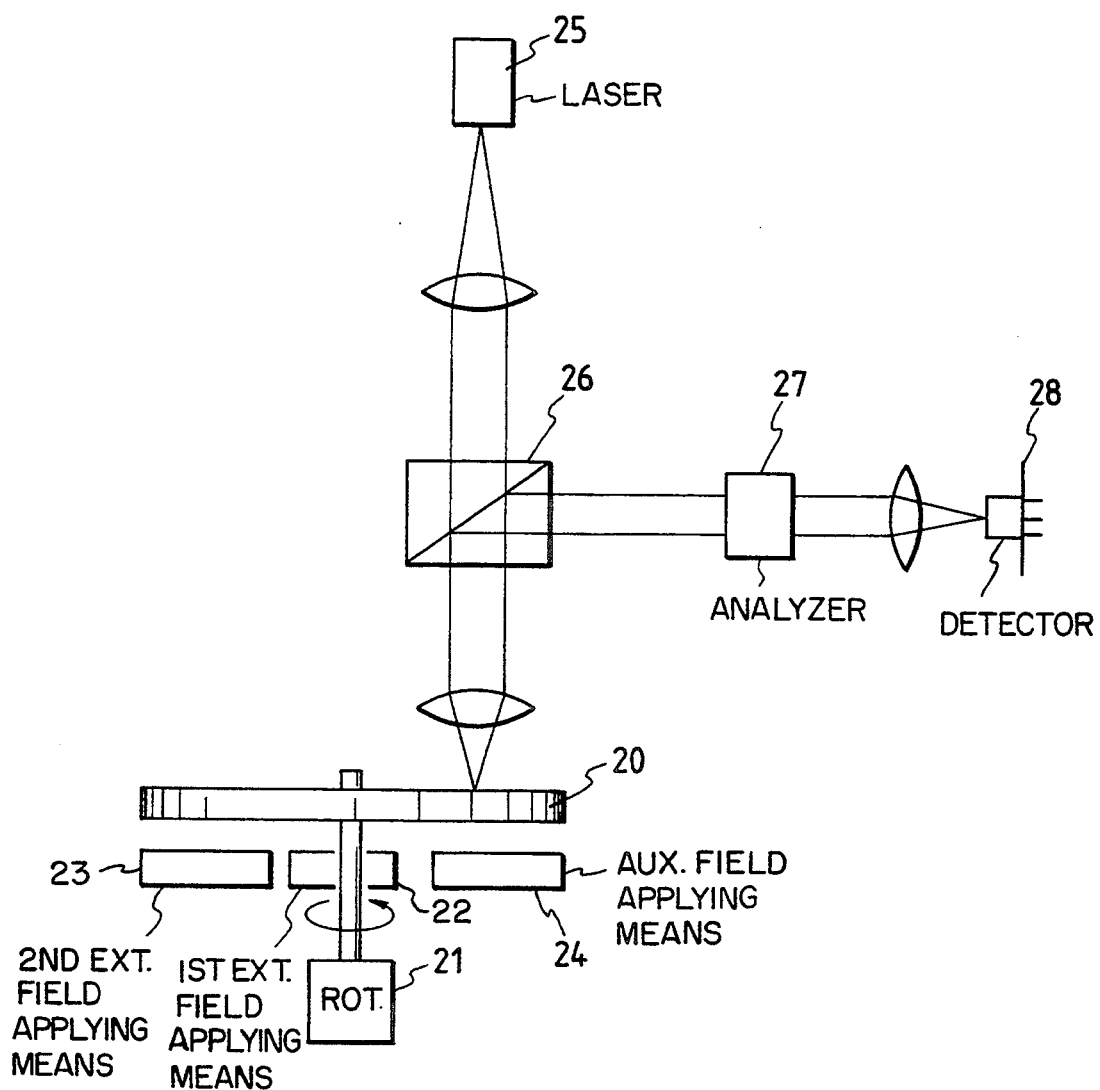

REPRODUCTION-ONLY MAGNETO-OPTICAL DISK WITH SELECTIVELY EXCHANGE COUPLED LAYERS, AND REPRODUCTION METHOD AND REPRODUCTION APPARATUS THEREFOR

BACKGROUND OF THE INVENTION

1. Field of the Invention

The present invention relates to a new reproduction-only magneto-optical disk, and a reproduction method and reproduction apparatus therefor.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, the magneto-optical recording/reproduction method is most attractive due to its unique advantages in that information can be erased after it is recorded, and new information can be repetitively recorded.

A magneto-optical recording disk (medium) used in the magneto-optical recording/reproduction method has a magnetic film consisting of one or a plurality of layers. An early magnetic film was a horizontal magnetic film (the direction of magnetization is parallel to the film surface). Then, a perpendicular magnetic layer or layers having a high recording density and signal intensity were developed. Today, the latter film is adopted in almost 100% of applications. Such a magnetic layer comprises, for example, amorphous GdFe or GdCo, GdFeCo, TbFe, TbCo, TbFeCo, and the like. The perpendicular magnetic layer normally has concentric or spiral tracks, and information is recorded on the tracks. There are two types of tracks, i.e., explicit tracks and implicit tracks.

A. Explicit Track

When a disk having explicit tracks is viewed from a direction perpendicular to the disk plane, spiral or concentric tracks for recording information are formed. A groove for tracking and separation is present between two adjacent tracks. A portion between adjacent grooves is called a land. In practice, the lands and grooves are reversed on the upper and lower surfaces of the disk. Thus, when the disk is viewed from the same direction as the beam incidence direction, a near portion is called a groove, and a far portion is called a land. A perpendicular magnetic film is formed on both the grooves and lands. For this reason, a groove portion may be used as a track, and a land portion may be used as a track. The widths of the groove and land have no special relationship therebetween.

In practice, lands formed on a surface in a spiral or concentric pattern, and grooves each sandwiched between two adjacent lands are normally present on a substrate. A perpendicular magnetic film is formed on such a substrate. Thus, the perpendicular magnetic layer has lands and grooves.

B. Mark

In this specification, one of "upward" and "downward" directions of magnetization with respect to a film surface is defined as an "A direction", and the other one is defined as a "non-A direction". Information to be recorded is binary-coded in advance, and is recorded by two signals, i.e., a mark ($B_1$) having an "A-directed" magnetization, and a mark ($B_0$) having a "non-A-directed" magnetization. These marks $B_1$ and $B_0$ respectively correspond to "1" and "0" levels of a digital signal or vice versa. In general, the direction of magnetization of the recording tracks is aligned in the "non-A direction" by applying a strong external field before recording. This processing for aligning the direction of magnetization is called "initializing". Thereafter, a mark ($B_1$) having an "A-directed" magnetization is formed on the tracks. One of the marks ($B_0$) and ($B_1$) is used as an information unit, and information is expressed by the presence/absence of the information unit (normally, the mark ($B_1$)) and/or its bit length. Note that the mark is now used for what has previously been called a pit or bit.

C. Principle of Mark Formation

In mark formation, the characteristic feature of a laser, i.e., excellent coherence in space and time, is effectively used to focus a beam into a spot as small as the diffraction limit determined by the wavelength of the laser light. The focused light is radiated onto the track surface to record information by producing marks less than 1 μm in diameter on the perpendicular magnetic layer. In optical recording, a recording density up to $10^8$ marks/cm$^2$ can be theoretically attained, since a laser beam can be concentrated into a spot with a size as small as its wavelength.

As shown in FIG. 1, in magneto-optical recording, a laser beam (L) is focused onto a perpendicular magnetic layer (MO) to heat it, while a bias field (Hb) is externally applied to the heated portion in a direction opposite to the initialized direction. A coercivity $H_C$ of the locally heated portion is decreased below the bias field (Hb). As a result, the direction of magnetization of that portion is aligned in the direction of the bias field (Hb). In this way, reversely magnetized marks are formed.

D. Principle of Reproduction

FIG. 2 shows the principle of information reproduction based on the magneto-optical effect. Light is an electromagnetic wave with an electromagnetic-field vector which normally diverges in all directions in a plane perpendicular to the light path. When light is converted to linearly polarized beams ($L_P$) and radiated onto a perpendicular magnetic layer (MO), it is reflected by its surface or passes through the perpendicular magnetic layer (MO). At This time, the plane of polarization rotates according to the direction of magnetization M. This phenomenon is called the magnetic Kerr effect or magnetic Faraday effect.

For example, if the plane of polarization of the reflected light rotates through $\theta_k$ degrees for the "A-directed" magnetization, it rotates through $-\theta_k$ degrees for the "non-A-directed" magnetization. Therefore, when the axis of an optical analyzer (polarizer) is set perpendicular to the plane inclined at $-\theta_k$, the light reflected by a "non-A-direction" magnetized mark ($B_0$) cannot pass through the analyzer. However, a component corresponding to a product of $(\sin 2\theta_k)^2$ and the light reflected by a mark ($B_1$) magnetized in the "A direction" passes through the analyzer and becomes incident on a detector (photoelectric conversion means). As a result, the mark ($B_1$) magnetized in the "A direction" looks brighter than the mark ($B_0$) magnetized in the "non-A direction", and the detector produces a stronger electrical signal for the mark ($B_1$). The electrical signal from the detector is modulated in accordance with the recorded information, thus reproducing the information.

E. TM and RE

The magnetic layer (perpendicular magnetic layer) preferably consists of an amorphous ferrimagnetic material containing an alloy of a transition metal (to be abbreviated to as TM hereinafter) and a heavy rare earth metal (to be abbreviated to as RE hereinafter). The TM includes, e.g., Fe and Co, and the RE includes, e.g., Gd, Tb, Dy, and Ho. The direction and magnitude of magnetization appearing outside the alloy are determined by the relationship between the direction and magnitude of TM sublattice magnetization and those of RE sublattice magnetization in the alloy. For proposes of explanation herein, the direction and magnitude of TM sublattice magnetization are taken as expressed by a vector indicated by a dotted arrow, those of RE sublattice magnetization are taken as expressed by a vector indicated by a solid arrow, and those of magnetization of the entire alloy are taken as expressed by a vector indicated by a hollow arrow. The hollow arrow (vector) is expressed as the sum of the dotted arrow (vector) and the solid arrow (vector). In the alloy, however, the directions of the dotted arrow (vector) and the solid arrow (vector) are always opposite to each other due to the interaction between the TM sublattice magnetization and the RE sublattice magnetization. Therefore, when the strengths of the two sublattice magnetizations are equal to each other, the sum of the dotted arrow (vector) and the solid arrow (vector), i.e., the vector of the alloy becomes zero (that is, the magnitude of magnetization appearing outside the alloy is zero). An alloy composition making the vector of the alloy zero is called a compensation composition. When the alloy has a composition other than the compensation composition, it has a strength equal to a difference between the strengths of the two sublattice magnetizations, and has a hollow arrow (vector) having a direction equal to that of the larger vector.

Thus, a magnetization vector of the alloy is expressed by illustrating dotted and solid vectors adjacent to each other, as shown in, e.g., FIG. 3. The RE and TM sublattice magnetization states of the alloy can be roughly classified into four states, as shown in FIGS. 4(1A) to 4(4A). Magnetization vectors (hollow arrows) of the alloy in the corresponding states are shown in FIGS. 4(1B) to 4(4B). For example, when the RE vector is larger than the TM vector, the sublattice magnetization state is shown in FIG. 4(1A), and the magnetization vector of the alloy is shown in FIG. 4(1B).

When one of the strengths of the RE and TM vectors is larger than the other, the alloy composition is referred to as "TM rich" or "RE rich" named after the vector having the larger strength. The direction of magnetization of the entire alloy coincides with the direction of ◯◯ sublattice magnetization of ◯◯ rich.

Both first and second magnetic layers can be classified into TM rich compositions and RE rich compositions. Therefore, when the composition of the first magnetic layer is plotted along the ordinate and that of the second magnetic layer is plotted along the abscissa, the types of medium as a whole can be classified into four quadrants shown in FIG. 5. In FIG. 5, the intersection of the abscissa and the ordinate represents the compensation composition of the two layers.

When the two layers are exchange-coupled to each other, an exchange coupling force $\sigma_w$ acts between the two layers. The exchange coupling force $\sigma_w$ aligns each of the directions of sublattice magnetization of TM and RE in the same direction. For this reason, when the two layers are exchange-coupled to each other, there are two types of stable two-layered films, i.e., (i) a two-layered film which is stable when the direction of magnetization of the first magnetic layer is parallel to that of the second magnetic layer, and (ii) a two layered film which is stable when the directions of magnetization of the two layers are anti-parallel to each other. In either case, in a stable state, the directions of TM sublattice magnetization of the two layers coincide with each other. Of course, the directions of RE sublattice magnetization of the two layers coincide with each other. The former (i) is called a parallel type abbreviated as a P type, and the latter (ii) is called an anti-parallel type abbreviated as an A type. The former (i) is unstable when the directions of magnetization of the two layers are anti-parallel to each other, and at this time, an interface magnetic wall is formed between the two layers. The latter (ii) is unstable when the directions of magnetization of the two layers are parallel to each other, and at this time, an interface magnetic wall is formed between the two layers. In the unstable state, the directions of TM sublattice magnetization of the two layers do not coincide with each other, and the directions of RE sublattice magnetization of the two layers do not coincide with each other, either. Although a state opposite to the stable state is mentioned as an "unstable" state, this state is actually a quasi-stable state which is maintained for several years to several tens of years. The P type film belongs to the first and third quadrants shown in FIG. 5, and the A type film belongs to the second and fourth quadrants.

The conventional magneto-optical recording disk has an advantage of being able to repetitively perform recording/reproduction operations. However, when the disk is erroneously applied with an excessively high magnetic field or an abnormally high temperature, information may be lost.

The object of the present invention is to solve the problems of the magneto-optical recording disk.

SUMMARY OF THE INVENTION

As a result of extensive studies, the present inventor has discovered a new magneto-optical disk of a reproduction-only type, and a reproduction method and reproduction apparatus therefor. It was also surprisingly discovered that this disk can increase the information density as compared to conventional reproduction-only optical disks (e.g., compact disks (CD) or laser disks (LD)).

According to one of its principal aspects, the present invention provides a magneto-optical disk of a first type having first and second magnetic layers stacked on a substrate, and including first micro areas $\alpha_0$ where an exchange coupling force acts between the two magnetic layers, and second micro areas $\alpha_1$ where an exchange coupling force does not act between the two magnetic layers. Either or both of the two kinds of micro areas serve as information units, and information is expressed by the presence/absence or length of the information units. The two magnetic layers are exchange-coupled to each other at a temperature equal to or lower than the Curie temperatures of the two layers in the first micro areas, and the directions of magnetization of the two magnetic layers can be aligned at room temperature in a state wherein an interface magnetic wall is formed between the two magnetic layers in the first micro areas.

Preferably, both the first and second magnetic layers have perpendicular magnetic anisotropy.

According to another of its principal aspects, the invention provides a magneto-optical disk of a second type having first and second layers stacked on a substrate, and including first micro areas $\alpha_0$ where the second magnetic layer is present, and second micro areas $\alpha'_1$ where no second magnetic layer is present. The two magnetic layers are exchange-coupled to each other at a temperature equal to or lower than the Curie temperatures of the two layers, and the directions of magnetization of the two magnetic layers can be aligned at room temperature in a state wherein an interface magnetic wall is formed between the two magnetic layers. Either or both of the two kinds of micro areas serve as information units, and the presence/absence or length of the information units expresses information.

Preferably both the first and second magnetic layers have perpendicular magnetic anisotropy. Preferably also, the first magnetic layer consists of at least two layers including a layer having a relatively high Curie temperature, and a layer having a relatively low Curie temperature.

Additional aspects of the invention include reproduction methodology and apparatus for the above disks, and will be described fully hereinafter.

Principles of the Invention

The principle of the disk of the first type according to the present invention will be described below with reference to the accompanying drawings. In this case, a perpendicular magnetic layer will be exemplified. However, the same applies to a horizontal magnetic layer as long as a laser beam is obliquely radiated. In this case, only a Z component (which means a component in the direction of the beam) of magnetization can be considered.

FIG. 6A shows the perpendicular section of the disk of the present invention, FIG. 6A does not illustrate the directions of magnetization since they are random at this time. The present invention is not limited as to which of the coercivities and Curie temperatures of the first and second magnetic layers are larger at room temperature. However, in the following description, for the sake of simplicity, assume that a coercivity $H_{C1}$ of the first magnetic layer is smaller than that of the second magnetic layer, and a Curie temperature $T_{C1}$ of the first magnetic layer is lower than that of the second magnetic layer.

The disk of the present invention has the first micro areas $\alpha_0$ where an exchange coupling force acts between the two layers, and the second micro areas $\alpha_1$ where the exchange coupling force does not act between the two layers. In each area $\alpha_1$, an exchange coupling force cutoff layer D (to be abbreviated to as a D layer hereinafter) indicated by a bold line is formed between the two layers. One or both of the areas $\alpha_0$ and $\alpha_1$ serve as information units, and information is expressed by the presence/absence or length of the information units. More specifically, this information unit has the same function as that of pits or marks.

The disk is subjected to a preliminary treatment. The typical preliminary treatment will be described below.

When the disk is of P type, the preliminary treatment includes two processes, i.e., a pre-process and a post-process. In the pre-process, a first external field $H_{ex1}$ larger than the coercivity $H_{C2}$ of the second magnetic layer is applied to the disk in the "A direction". The field $H_{ex1}$ satisfies:

$$H_{ex1} > H_{C2} - \frac{\sigma_w}{2M_{S2}t_2} \qquad \text{FORMULA 1}$$

For the purposes of the present discussion $M_{S1}$ is the saturated magnetization of the first magnetic layer, $t_1$ is the film thickness of the first magnetic layer, $M_{S2}$ is the saturated magnetization of the second magnetic layer, and $t_2$ is the film thickness of the second magnetic layer. The directions of magnetizations of both the first and second magnetic layers are aligned in the "A direction" $\uparrow$. This state is shown in FIG. 6B. At this time, when the temperatures of the magnetic layers are increased to higher than room temperature, the coercivity may be decreased. In this case, a small first external field $H_{ex1}$ need only be applied. In order to increase the temperatures of the magnetic layers, a laser beam may be radiated.

In the post-process, a second external field $H_{ex2}$ larger than the coercivity $H_{C1}$ of the first magnetic layer and smaller than the coercivity $H_{C2}$ of the second magnetic layer is applied to the disk in the "non-A direction". The field $H_{ex2}$ satisfies:

$$H_{C1} + \frac{\sigma_w}{2M_{S1}t_1} < H_{ex2} < H_{C2} - \frac{\sigma_w}{2M_{S2}t_2} \qquad \text{FORMULA 2}$$

In this case, the temperatures of the magnetic layers may also be increased to be higher than room temperature. However, the increased temperatures must be equal to or lower than the Curie temperatures of the two layers. As a result, the direction of magnetization of the second magnetic layer is aligned in the "non-A direction" $\downarrow$. At this time, the aligned magnetization of the second magnetic layer must not be reversed. For this reason, the two magnetic layers must simultaneously satisfy:

$$H_{C1} + \frac{\sigma_w}{2M_{S1}t_1} < H_{C2} - \frac{\sigma_w}{2M_{S2}t_2} \qquad \text{FORMULA 3}$$

$$H_{C1} > \frac{\sigma_w}{2M_{S1}t_1} \qquad \text{FORMULA 4}$$

$$H_{C2} > \frac{\sigma_w}{2M_{S2}t_2} \qquad \text{FORMULA 5}$$

The direction of magnetization of the P type disk is stable when the directions of magnetization of the two layers are parallel to each other. Thus, in the first micro area $\alpha_0$ where the exchange coupling force acts, the directions of magnetization of the two layers are antiparallel to each other, and the state of this area is unstable (quasi-stable). For this reason, an interface magnetic wall W (indicated by a bold dotted line) is formed between the two layers in the area $\alpha_0$. This state is shown in FIG. 6C. In this manner, the pre-process is completed.

In the case of an A type disk, the first external field $H_{ex1}$ need only be applied to the disk in the "A direction", thus completing the pre-process. In this case, the field $H_{ex1}$ must satisfy:

$$H_{ex1} > H_{C2} + \frac{\sigma_w}{2M_{S2}t_2} \qquad \text{FORMULA 6}$$

A reproduction process will be described below. A laser beam at a reproduction level is radiated from the side of the first magnetic layer. The disk is rotated, as a matter of course. The spot size of the laser beam on the disk is assumed to be slightly larger than a size three times the minimum area $\alpha_0$ or $\alpha_1$. For this reason, the spot size includes three minimum areas $\alpha_0$ or $\alpha_1$. The three areas correspond to binary coded information "010" in FIGS. 7 and 8. In the conventional CD or LD, in this case, three pieces of information "010", "100", and "001" cannot be distinguished from each other because these pieces of information have no difference in reflection light amount from the spot. Similarly, when the minimum areas $\alpha_0$ or $\alpha_1$ are present at the same positions in two adjacent tracks, three pieces of information "010", "100", and "001" cannot be distinguished from each other, either. For this reason, in the conventional CD or LD, the size of the minimum area $\alpha_0$ or $\alpha_1$ cannot become smaller than a spot size 103. The spot size is obtained by focusing a laser beam 101 by an objective lens 102. For this reason, the spot size cannot be focused to be smaller than the wavelength of the laser due to a diffraction limit. When an existing semiconductor laser (wavelength $\lambda$) is used, a spot size of about 1 $\mu$m ($\simeq\lambda$) or less cannot be obtained. Thus, the recording density of the conventional CD or LD is limited.

However, the intensity distribution of the laser beam becomes higher toward the center. For this reason, the temperature distribution in the spot becomes higher toward the center. Since the disk is moving, the temperature of the magnetic layer corresponding to a portion which entered the range of the spot first becomes higher than other portions due to a heat accumulation effect. For this reason, the temperature of an area $\alpha_0$ 104 surrounded by a small solid circle in FIG. 8 is increased to a temperature $T_R$ at which the interface magnetic wall present between the two layers disappears, and the magnetizations of the two layers do not disappear. Thus, in the area $\alpha_0$ 104 surrounded by the small solid circle, the direction of magnetization of the first magnetic layer is reversed upon reception of the exchange coupling force from the second magnetic layer. As a result, the interface magnetic wall disappears. At this time, an auxiliary field may be applied to the spot position in the "non-A direction" $\downarrow$. Thus, the direction of magnetization of the first magnetic layer can be easily reversed, and the lowest temperature of the temperature $T_R$ can be decreased.

In this area, since the disk is of P type, the direction of magnetization of the first magnetic layer is aligned in the "non-A direction" $\downarrow$ ("A direction" for A type) same as that of the second magnetic layer, as shown in FIG. 8. On the other hand, in the area $\alpha_1$, the direction of magnetization of the first magnetic layer is not reversed even at the temperature $T_R$ since the area $\alpha_1$ does not receive the exchange coupling force from the second magnetic layer.

In contrast to this, since the temperature of an area $\alpha_0$ 105 surrounded by a dotted circle is not increased to $T_R$ although this area also receives the exchange coupling force, the direction of magnetization of the first magnetic layer is not reversed. Therefore, at the position in FIG. 8, only the area $\alpha_0$ 104 surrounded by the solid circle exhibits "non-A-directed" $\downarrow$ magnetization in the spot, and other areas exhibit "A-directed" $\uparrow$ magnetization. For this reason, even when areas $\alpha_0$ are present at forward, backward, and right, and left neighboring positions, only one area $\alpha_0$ surrounded by the solid circle undergoes a "come out" process in the spot, and can be detected. When one area can be detected, if light reflected by or transmitted through the area is magneto-optically processed, a decreased light amount is detected. Thus, when light is converted into an electrical signal by a photoelectric conversion means, only a piece of binary coded information "0" can be detected.

Next, assume that the disk is moved by the minimum area $\alpha_0$ or $\alpha_1$. In the case of FIG. 8, the temperature of the area $\alpha_1$ reaches the temperature $T_R$ in turn. However, since the area $\alpha_1$ has the D layer, and does nor receive the exchange coupling force from the second magnetic layer, the direction of magnetization of the first magnetic layer is not reversed. Therefore, all the areas in the spot exhibit "A-directed" magnetization $\uparrow$, and no decreased light amount is detected. In other words, the area $\alpha_0$ is not detected.

Assume that the disk is further moved by the minimum area $\alpha_0$ or $\alpha_1$. In the case of FIG. 8, the area $\alpha_0$ 105 surrounded by the dotted circle undergoes the "come out" process in turn, and only one area $\alpha_0$ 105 surrounded by the dotted circle is detected. When the size of the minimum area $\alpha_0$ or $\alpha_1$ is smaller than the spot size, i.e., the wavelength of the reproduction beam, the present invention is effective.

The principle of reproduction has been described. Once the disk is reproduced, since the interface magnetic wall disappears, the "come out" process is disabled. However, the disk can be repetitively subjected to the above-mentioned pre-process, and can be reproduced after the pre-process. In the case of the P type disk, only the second external field $H_{ex2}$ satisfying formula 2 need be applied. In the case of the A type disk, only the second external field $H_{ex2}$ satisfying the following formula 7 need be applied in place of the first external field $H_{ex1}$.

$$H_{ex2} > H_{C1} + \frac{\sigma_w}{2M_{S1}t_1} \qquad \text{FORMULA 7}$$

Thus, in either the P or A type disk, the pre-process can be completed by applying only the second external field $H_{ex2}$. For example, when the manufacturer of the disk completed a process by the first external field upon delivery from a factory, a user's reproduction apparatus need only have a means for applying the second external field.

Since the magnetic layers can be thin, they are normally formed on a disk-shaped substrate (e.g., a glass or plastic substrate). The substrate may have guide grooves for tracking. Even if no grooves are formed, since the areas $\alpha_0$ or $\alpha_1$ are formed in the tracks, tracking can be performed with reference to these areas.

One of the first and second magnetic layers is formed on the substrate by a vacuum thin film formation technique such as vacuum deposition, sputtering, or the like. As the material of each magnetic layer, a transition metal-heavy rare earth alloy is preferable. However, the present invention is not limited to this. The magnetic layers preferably comprise perpendicular magnetic layers, but may comprise horizontal magnetic layers. When the latter layers are used, a laser beam may be obliquely radiated in reproduction. Thus, the perpendicular component can be detected. The film thickness of each magnetic layer normally falls within a range of 100 and 500 Å.

On the magnetic layer, a D layer for forming the areas $\alpha_0$ or $\alpha_1$ is formed by the vacuum thin film formation technique. The material of the D layer includes, e.g., a dielectric such as an oxide, nitride, fluoride, or carbonate of a metal, an organic resin, a diamond-like hard carbon film, and the like. The D layer may consist of an oxide obtained by oxidizing the magnetic layer formed previously. The thickness of the D layer can normally fall within a range of 5 to 1,000 Å. The D layer must be patterned in a predetermined pattern in accordance with desired information so as to form the areas $\alpha_0$ or $\alpha_1$ along the tracks. In patterning, a photolithography technique is used. A photoresist is applied onto the uniformly formed D layer, and a laser beam is radiated onto the photoresist according to the predetermined pattern or its reversal pattern. When the minimum area $\alpha_0$ or $\alpha_1$ is to be formed as small as possible to increase the recording density, a beam having a wavelength as short as possible must be used. The beam is not limited to visible light, but electron beams, X-rays, ultraviolet rays, or the like may be used. When the radiated photoresist is developed, a resist pattern is obtained. The D layer is then etched. A portion, exposed from the resist pattern, of the D layer is removed by etching. Finally, the remaining resist pattern is removed by, e.g., ashing. As a result, the D layer in the predetermined pattern is obtained. In some cases, after the D layer is uniformly formed, it may be directly patterned by a laser marking technique. Then, the other one of the first and second magnetic layers is formed. In some cases, an exchange coupling force $\alpha_w$ adjusting layer may be formed before or after formation of the D layer. The adjusting layer may be formed on the entire substrate, but may be formed on only the areas $\alpha_0$, which receive the exchange coupling force. The material of the $\alpha_w$ adjusting layer may be selected from magnetic materials in addition to materials similar to those of the D layer. The thickness of the $\alpha_w$ adjusting layer is normally selected from a range between 1 to 500 Å. However, the $\alpha_w$ adjusting layer must not cause the exchange coupling force to disappear.

Each of the first and second magnetic layers may consist of a plurality of layers in place of a single layer. The boundary between the first and second magnetic layers need not be clearly formed, and one layer may be gradually changed into the other layer.

When information is reproduced from reflected light, a laser beam (linearly polarized light) is radiated onto the first magnetic layer. In this case, a third magnetic layer having large $\theta_k$ may be formed on the read side of the first magnetic layer. The direction of magnetization of the third magnetic layer is parallel or anti-parallel to that of the first magnetic layer within a temperature range between room temperature and $T_R$.

A reproduction method of the magneto-optical disk of the first type described above, and a reproduction apparatus therefor are also included in the present invention. More specifically, in an aspect of the invention, there is provided a magneto-optical reproduction method of a magneto-optical disk of the first type, comprising the steps of:

providing a disk of the first type;

executing a pre-process to attain a state wherein a direction of magnetization of a first magnetic layer is aligned, a direction of magnetization of a second magnetic layer is also aligned, and in at least a first micro area $\alpha_0$ to be subjected to reproduction, an interface magnetic wall is formed between the first and second magnetic layers;

radiating a laser beam onto the disk to increase temperatures of the two layers in a portion of the disk to a temperature at which the interface magnetic wall present between the two layers disappears, and the magnetizations of the first and second magnetic layers do not disappear; and magneto-optically processing light of the laser beam reflected by or transmitted through the disk to convert the light into an electrical signal.

A magneto-optical disk of a second type according to the present invention will be described below. In this magneto-optical disk, an area $\alpha'_1$ where no second magnetic layer is present is provided in place of the area $\alpha_1$ where no exchange coupling force acts. The magneto-optical disk of the second type according to the present invention has first and second magnetic layers stacked on a substrate. The two magnetic layers are exchange-coupled to each other at a temperature equal to or lower than the Curie temperatures of the two layers, and the directions of magnetization of the two magnetic layers can be aligned at room temperature in a state wherein an interface magnetic wall is formed between the two magnetic layers. The disk comprises first micro areas $\alpha_0$ where the second magnetic layer is present, and second micro areas $\alpha'_1$ where no second magnetic layer is present.

Either or both of two kinds of micro areas serve as information units, and the presence/absence or length of the information units expresses information.

Preferably, also both the first and second magnetic layers have perpendicular magnetic anisotropy. Preferably, the first magnetic layer consists of at least two layers including a layer having a relatively high Curie temperature, and a layer having a relatively low Curie temperature.

The principle of the magneto-optical disk of the second type according to the present invention will be described below with reference to the accompanying drawings. In this case, a perpendicular magnetic layer will be exemplified. However, even when a horizontal magnetic layer is employed, only a Z component (which means a component in the direction of the beam) of magnetization can be considered. FIG. 9A shows the perpendicular section of the disk of the present invention. FIG. 9A does not illustrate the directions of magnetization since they are random at this time. The present invention is not limited as to which of the coercivities and Curie temperatures of the first and second magnetic layers are larger at room temperature. However, in the following description, for the sake of simplicity, assume that a coercivity $H_{C1}$ of the first magnetic layer is smaller than that of the second magnetic layer, and a Curie temperature $T_{C1}$ of the first magnetic layer is lower than that of the second magnetic layer.

The preferred disk of the present invention has first micro areas $\alpha_0$ where the direction of magnetization of the first magnetic layer is aligned, the direction of magnetization of the second magnetic layer is also aligned, the second magnetic layer is present, and an exchange coupling force acts between the two layers, and second micro areas $\alpha'_1$ where no second magnetic layer is formed. One of the areas $\alpha_0$ and $\alpha'_1$ is used as an information unit, and information is expressed by the presence/absence or length of the information unit. More specifically, the information unit has the same function as that of a pit or mark. The disk is subjected to a preliminary treatment. The typical preliminary treatment will be described below. When the disk is of P type, the preliminary treatment includes two processes, i.e., a pre-process and a post-process. In the pre-process, a first external field $H_{ex1}$ larger than the coercivity $H_{C2}$ of the second magnetic layer is applied to the disk in the "non-A direction". The field $H_{ex1}$ satisfies:

$$H_{ex1} > H_{C2} - \frac{\sigma_w}{2M_{S2}t_2} \quad \text{FORMULA 1}$$

where $M_{S2}$ is the saturated magnetization of the second magnetic layer, and $t_2$ is the film thickness of the second magnetic layer. The directions of magnetizations of both the first and second magnetic layers are aligned in the "non-A direction" ↓. This state is shown in FIG. 9B. At this time, when the temperatures of the magnetic layers are increased to higher than room temperature, the coercivity may be decreased. In this case, a small first external field $H_{ex1}$ need only be applied. In order to increase the temperatures of the magnetic layers, a laser beam may be radiated.

In the post-process, a second external field $H_{ex2}$ larger than the coercivity $H_{C1}$ of the first magnetic layer and smaller than the coercivity $H_{C2}$ of the second magnetic layer is applied to the disk in the "A direction" ↑.

The field $H_{ex2}$ satisfies:

$$H_{C1} + \frac{\sigma_w}{2M_{S1}t_1} < H_{ex2} < H_{C2} - \frac{\sigma_w}{2M_{S2}t_2} \quad \text{FORMULA 2}$$

where $M_{S1}$ is the saturated magnetization of the first magnetic layer, and $t_1$ is the film thickness of the first magnetic layer. At this time, the temperatures of the magnetic layers may also be increased to be higher than room temperature. However, the increased temperatures must be equal to or lower than the Curie temperatures of the two layers. As a result, the direction of magnetization of the first magnetic layer is aligned in the "A direction" ↑. At this time, the aligned magnetization of the second magnetic layer must not be reversed. For this reason, the two magnetic layers must simultaneously satisfy:

$$H_{C1} + \frac{\sigma_w}{2M_{S1}t_1} < H_{C2} - \frac{\sigma_w}{2M_{S2}t_2} \quad \text{FORMULA 3}$$

$$H_{C1} > \frac{\sigma_w}{2M_{S1}t_1} \quad \text{FORMULA 4}$$

$$H_{C2} > \frac{\sigma_w}{2M_{S2}t_2} \quad \text{FORMULA 5}$$

The direction of magnetization of the P type disk is stable when the directions of magnetization of the two layers are parallel to each other. Thus, in the first micro area $\alpha_0$ where the second magnetic layer is formed, and the exchange coupling force acts, the directions of magnetization of the two layers are anti-parallel to each other, and the state of this area is unstable (quasi-stable).

For this reason, an interface magnetic wall W (indicated by a bold dotted line) is formed between the two layers in the area $\alpha_0$. This state is shown in FIG. 9C. In this manner, the pre-process is completed. In this state, the direction of magnetization of the first magnetic layer is aligned, the direction of magnetization of the second magnetic layer is also aligned, and an interface magnetic wall is formed between the two layers in at least the first micro area $\alpha_0$ to be subjected to reproduction.

In the case of an A type disk, the first external Field $H_{ex1}$ need only be applied to the disk in the "A direction" ↑, thus completing the pre-process. In this case, the field $H_{ex1}$ must satisfy:

$$H_{ex1} > H_{C2} + \frac{\sigma_w}{2M_{S2}t_2} \quad \text{FORMULA 6}$$

A reproduction process will be described below. A laser beam at a reproduction level is radiated from side of the first magnetic layer. The disk is rotated, as a matter of course. The spot size of the laser on the disk is assumed to be slightly larger than a size three times the minimum micro area $\alpha_0$ or $\alpha'_1$. For this reason, the spot size includes three minimum micro areas $\alpha_0$ or $\alpha'_1$. The three areas correspond to binary coded information "010" in FIGS. 10 and 11. In the conventional CD or LD, in this case, three pieces of information "010", "100", and "001" cannot be distinguished from each other because these pieces of information have no difference in reflection light amount from the spot. Similarly, when the minimum micro areas $\alpha_0$ or $\alpha'_1$ are present at the same positions in two adjacent tracks, three pieces of information "010", "100", and "001" cannot be distinguished from each other, either. For this reason, in the conventional CD or LD, the minimum size of the micro area $\alpha_0$ or $\alpha'_1$ cannot become smaller than a spot size. The spot size is obtained by focusing a laser beam by an objective lens. For this reason, the spot size cannot be focused to be smaller than the wavelength the laser due to a diffraction limit. When an existing semiconductor laser is used, a spot size of about 1 μm or less cannot be obtained. Thus, the recording density of the conventional CD or LD is limited. However, the intensity distribution of the laser beam becomes higher toward the center. For this reason, the temperature distribution in the spot becomes higher toward the center. Since the disk is moving, the temperature of the magnetic layer corresponding to a portion which entered the range of the spot first becomes higher than other portions due to a heat accumulation effect. For this reason, the temperatures of the two magnetic layers in an area $\alpha_0$ surrounded by a small solid circle in FIG. 11 are increased upon radiation of a laser beam to a temperature $T_R$ at which the interface magnetic wall present between the two layers disappears, and the magnetizations of the two layers do not disappear. Thus, in the area $\alpha_0$ surrounded by the small solid circle, the direction of magnetization of the first magnetic layer is reversed upon reception of the exchange coupling force from the second magnetic layer. As a result, the interface magnetic wall disappears. At this time, an auxiliary field may be applied to the spot position in the "non-A direction" ↓. Thus, the direction of magnetization of the first magnetic layer can be easily reversed, and the lowest temperature of the temperature $T_R$ can be decreased. In this state, the direction of magnetization of the first magnetic layer is aligned in the "non-A direction", as shown in FIG. 11. On the other hand, since no second magnetic layer is formed and no exchange coupling force acts in an area $\alpha'_1$, the direction of magnetization of the first magnetic layer is not reversed even at the temperature $T_R$. In contrast to this, since the temperatures of the two layers in an area $\alpha_0$ surrounded by a dotted circle are not increased to $T_R$ although this area also receives the exchange coupling force, the direction of magnetization of the first magnetic layer is not reversed. Therefore, at the position in FIG. 11, only the area $\alpha_0$ surrounded by the solid circle exhibits "non-A-directed" ↓ magnetization in the spot, and other areas exhibit "A-directed" ↑ magnetization. For this reason, even when areas $\alpha_0$ are present at forward, backward, and right, and left neighboring positions, only one area $\alpha_0$ surrounded by the solid circle undergoes a "come out" process in the spot, and can be detected. When one area can be detected, if light reflected by or transmitted through the area is magneto-optically processed, a decreased light amount is detected. Thus, when light is converted into an electrical signal by a photoelectric conversion means, only a piece of binary coded information "0" can be detected.

Assume that the disk is moved by the minimum micro area $\alpha_0$ or $\alpha'_1$. In the case of FIG. 11, the temperature of the area $\alpha'_1$ then reaches the temperature $T_R$ in turn. However, since the area $\alpha'_1$ does not receive the exchange coupling force, the direction of magnetization of the first magnetic layer is not reversed. Therefore, all the areas in the spot exhibit "A-directed" ↑ magnetization, and no decreased light amount is detected. More specifically, the area $\alpha_0$ is not detected. Assume that the disk is moved by the minimum area $\alpha_0$ or $\alpha'_1$. In the case of FIG. 11, an area $\alpha_0$ surrounded by a dotted circle then undergoes a "come out" process, and only one area $\alpha_0$ surrounded by the dotted circle is detected. The principle of reproduction has been described. Once the disk is reproduced, since the interface magnetic wall disappears, the "come out" process is disabled. However, the disk can be repetitively subjected to the above-mentioned pre-process, and can be reproduced after the pre-process. In the case of the P type disk, only the second external field $H_{ex2}$ satisfying formula 2 need be applied. In the case of the A type disk, only the second external field $H_{ex2}$ satisfying the following formula 7 need be applied in place of the first external field $H_{ex1}$.

$$H_{ex2} > H_{C1} + \frac{\sigma_w}{2M_{S1}t_1} \qquad \text{FORMULA 7}$$

Thus, in either of the P or A type disk, the pre-process can be completed by applying only the second external field $H_{ex2}$.

Since the magnetic layers can be thin, they are normally formed on a disk-shaped substrate (e.g., a glass or plastic substrate). The substrate may have guide grooves for tracking. Even if no grooves are formed since the areas $\alpha_0$ or $\alpha'_1$ are formed in the tracks, tracking can be performed with reference to these areas. The first magnetic layer is formed on the substrate by a vacuum thin film formation technique such as vacuum deposition, sputtering, or the like. The second magnetic layer is then formed while maintaining the vacuum. In some cases, an exchange coupling force adjusting layer may be formed between the two magnetic layer. However, the $\sigma_w$ adjusting layer must not cause an exchange coupling force to disappear. As the material of the magnetic layers, a transition metal-heavy rare earth alloy is preferable. However, the present invention is not limited to this.

The magnetic layers preferably comprise perpendicular magnetic layers, but may comprise horizontal magnetic layers. The film thickness of each magnetic layer normally falls within a range of 100 and 1,000 Å. A protective layer is formed on the magnetic layers by the vacuum thin film formation technique. The material of the protective layer includes, e.g., a dielectric such as an oxide, nitride, fluoride, or carbonate of a metal, an organic resin, a diamond-like hard carbon film, and the like. The thickness of the protective layer can normally fall within a range 100 to 1,000 Å. The second magnetic layer must be patterned in a predetermined pattern in accordance with desired information so as to form the areas $\alpha_0$ or $\alpha'_1$ along the tracks. In patterning, a photolithography technique is used. A photoresist is applied onto the uniformly formed second magnetic layer (and the protective layer), and a laser beam is radiated onto the photoresist according to the predetermined pattern or its reversal pattern. When the minimum area $\alpha_0$ or $\alpha'_1$ is to be formed as small as possible to increase the recording density, a beam having a wavelength as short as possible must be used. The beam is not limited visible light, but electron beams, X-rays, ultraviolet rays, or the like may be used. When the radiated photoresist is developed, a resist pattern is obtained. Then, the protective layer and the second magnetic layer are etched. Portions, exposed from the resist pattern, of the protective layer and the second magnetic layer are removed by etching. Finally, the remaining resist pattern is removed by, e.g., ashing. As a result, the second magnetic layer in the predetermined pattern is obtained. Each of the first and second magnetic layers may consist of a plurality of layers in place of a single layer. The boundary between the first and second magnetic layers need not be clearly formed, and one layer may be gradually changed into the other layer.

When information is reproduced from reflected light, a laser beam (linearly polarized light) is radiated onto the first magnetic layer. In this case, a third magnetic layer having larger $\theta_k$ may be formed on the read side of the first magnetic layer. The direction of magnetization of the third magnetic layer is parallel or anti-parallel to that of the first magnetic layer within a temperature range between room temperature and $T_R$.

A reproduction method of the magneto-optical disk of the second type described above is also included in the present invention, More specifically, in another aspect of the present invention, there is provided a magneto-optical reproduction method of a magneto-optical disk of the second type, comprising the steps of:

preparing a disk;

aligning the directions of magnetization of first and second magnetic layers;

radiating a laser beam onto the disk to increase temperatures of the magnetic layers in a portion of the disk to a temperature at which a direction of magnetization of a first micro area $\alpha_0$ is reversed, and a direction of magnetization of a second micro area $\alpha'_1$ is not reversed; and magneto-optically processing light as the laser beam reflected by or transmitted through the disk to convert the light into an electrical signal.

BRIEF DESCRIPTION OF THE DRAWINGS

FIGS. 6A to 6C are perpendicular sectional views showing the alignment states of directions of magnetization of a disk of the first type according to the present invention;

FIG. 18 is a schematic diagram showing an arrangement of a reproduction apparatus according to the second embodiment.

DETAILED DESCRIPTION OF THE PREFERRED EMBODIMENTS

The present invention will be described below with reference to its embodiments. However, the present invention is not limited to these embodiments.

First Embodiment . . . Anti-parallel Type Disk

Figure 16:
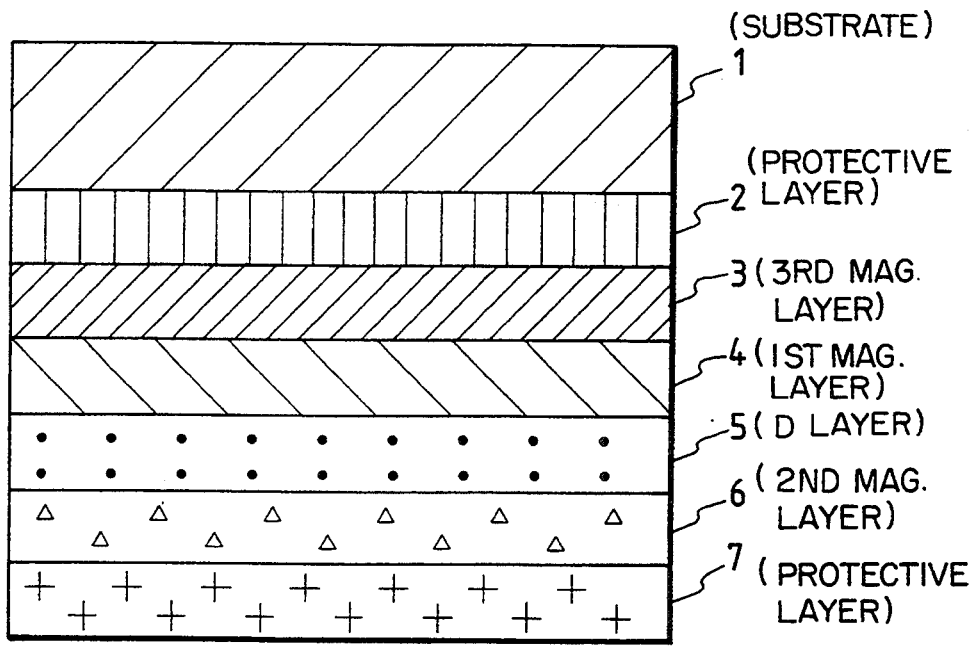
FIG. 16 is a sectional view showing the layer structure of the disk of the first embodiment.

FIG. 16 illustrates the layer structure of the disk.

(1) A 2P substrate 1 on which a large number of concentrical grooves having a depth h of 700 Å are formed at a pitch of 1.6 μm is prepared. The diameter of the 2P substrate is 130 mm.

(2) An RF magnetron sputtering apparatus is provided, and the 2P substrate 1 and various targets are set in a chamber of this apparatus. After the interior of the chamber is temporarily evacuated to a vacuum of $7 \times 10^{-7}$ Torr or less, Ar gas is supplied the chamber to $5 \times 10^{-3}$ Torr.

First, an Si target is used, and $N_2$ gas is supplied to the chamber in addition to the Ar gas. Then, reactive sputtering is performed to form a 700-Å thick silicon nitride film (first protective layer 2) on a resin layer.

Then, $N_2$ gas supply is stopped, and sputtering is performed using a GdFeCo-based alloy target in an Ar gas atmosphere of $5 \times 10^{-3}$ Torr. With this sputtering, a third magnetic layer 3 consisting of a GdFeCo-based perpendicular magnetic film is formed on the first protective layer 2. The third magnetic layer 3 has a film thickness t of 300 Å, a TM rich composition, a coercivity $H_C$ of 100 Oe, and a Curie temperature of 400° C. or higher.

The alloy target is replaced with a DyFeCo-based alloy target while maintaining the vacuum state, and sputtering is performed. Thus, a first magnetic layer 4 consisting of a DyFeCo-based perpendicular magnetic film is formed on the third magnetic layer 3. The first magnetic layer 4 has a film thickness $t_1$ of 250 Å, a TM rich composition, a coercivity $H_{C1}$ of 1,500 Oe, and a Curie temperature of 180° C.

The Si target is used again, and $N_2$ gas is supplied to the chamber in addition to the Ar gas. Reactive sputtering is performed to form a 100-Å thick silicon nitride film (D layer 5) on the first magnetic layer 4.

The obtained intermediate product is removed from the sputtering apparatus, and a photoresist is coated onto the D layer 5 using a spin coater. After pre-baking, an excimer laser (λ=248 nm) is radiated onto the photoresist while rotating the intermediate product. The laser is modulated by a predetermined frequency (standard information). After development and post-baking, a predetermined resist pattern is obtained. The pattern includes resist islands (similar to pits) scattered along the tracks. One island has a width of 0.6 μm and a length of 0.3 μm. The interval between adjacent islands in the moving direction of the disk is 0.3 μm. Then, dry etching is performed using Ar plasma. With this etching, the D layer other than the islands (i.e., the exposed D layer) is removed.

The intermediate product obtained as described above is set in the sputtering apparatus again. At the same time, various targets are set. After the interior of the chamber is temporarily evacuated to a vacuum of $7 \times 10^{-7}$ Torr or less, Ar gas is supplied to the chamber to $5 \times 10^{-3}$ Torr. Then, sputtering is performed using a TbDyFeCo-based alloy target. Thus, a second magnetic layer 6 consisting of a TbDyFeCo-based perpendicular magnetic film is formed on the patterned D layer 5. The second magnetic layer 6 has a film thickness $t_2$ of 350 Å, an RE rich composition, a coercivity $H_{C2}$ of 4,000 Oe, and a Curie temperature of 320° C.

Finally, the Si target is used again, and $N_2$ gas is supplied to the chamber in addition to Ar gas. Then, reactive sputtering is performed to form a 700-Å thick silicon nitride film (second protective layer 7) on the second magnetic layer 6.

In this manner, the disk of this embodiment is obtained. In this disk, a minimum area $\alpha_1$ where no exchange coupling force acts has a length of 0.3 μm.

Second Embodiment ... Reproduction Apparatus

FIG. 18 schematically shows an arrangement of a reproduction apparatus.

This apparatus is for an anti-parallel type disk, and mainly comprises a rotating means 21 for a disk 20, a first external field $H_{ex1}$ applying means 22, a laser beam light source 25 located at the downstream side of the $H_{ex1}$ applying means 22, an auxiliary field applying means 24 located at the side opposite to the light source 25 with respect to the disk, and a magneto-optical processing means (26, 27, and 28) located at the same side as the light source 25.

The first external field $H_{ex1}$ applying means 22 comprises a permanent magnet for outputting an "A-directed" ↑ magnetic field of 10 kOe (on the disk surface). The auxiliary field applying means 24 comprises a permanent magnet for outputting a "non-A-directed" ↓ magnetic field of 300 Oe (on the disk surface). The light source 25 comprises a semiconductor laser having $\lambda=780$ nm and a numerical aperture (NA)=0.55. The magneto-optical processing means comprises a (polarizing or non-polarizing) beam splitter 26, an analyzer 27, and a detector 28, which are arranged between the light source 25 and the disk 20.

The disk 20 is rotated by the rotating means 21, and is applied with the field $H_{ex1}$. Thus, the pre-process is completed. Then, a laser beam is radiated.

The beam output from the light source 25 is transmitted through (or reflected by) the beam splitter 26, is incident on the disk 20, and is reflected by the disk. The reflected light is reflected by (or transmitted through) the beam splitter 26, and propagates toward the analyzer 27 and the detector 28. The analyzer 27 may be a polarization beam splitter. In this case, light including information is output while being divided into two components. The output light components are converted into electrical signals by detectors 28 prepared in correspondence with the two light components. A difference between the two converted electrical signals is calculated to obtain a signal having a high C/N ratio.

The auxiliary field applying means is suitable for helping to reverse the direction of magnetization and to cause the interface magnetic wall between the two magnetic layers to disappear. However, since the direction of magnetization can be reversed by an exchange coupling force, the auxiliary field applying means may be omitted.

In an apparatus for a parallel type disk, a second external field $H_{ex2}$ applying means 23 is added between the $H_{ex1}$ applying means and the light source.

Third Embodiment ... Reproduction Method

Figure 1:
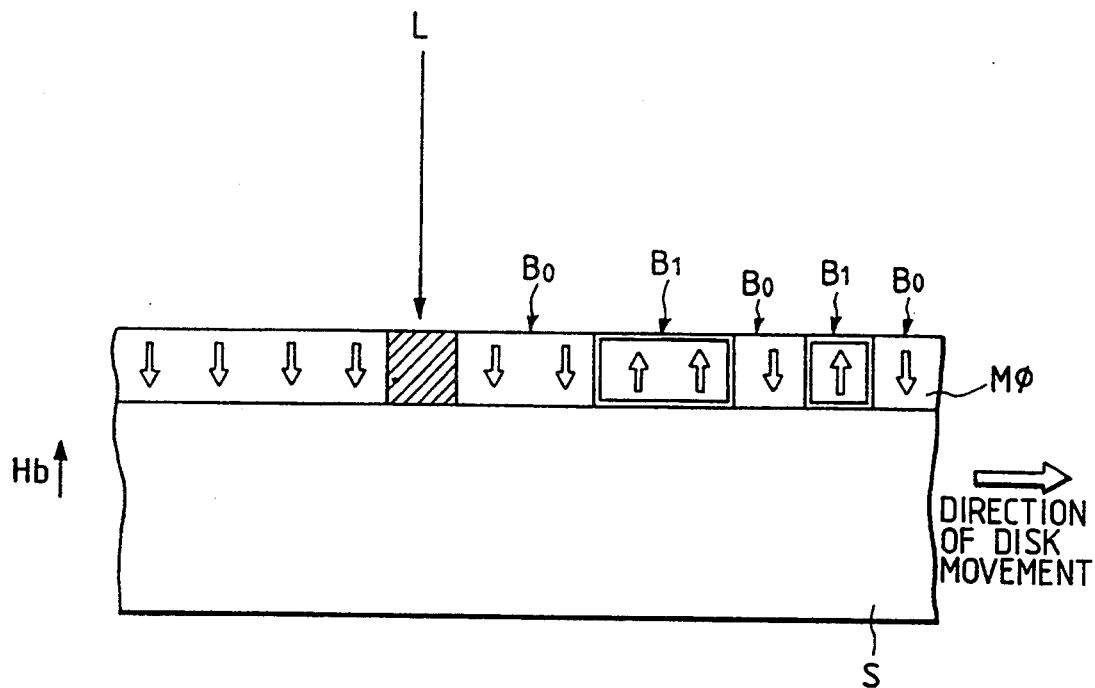
FIG. 1 is a schematic view for explaining the principle of recording of a magneto-optical recording system.
Figure 2:
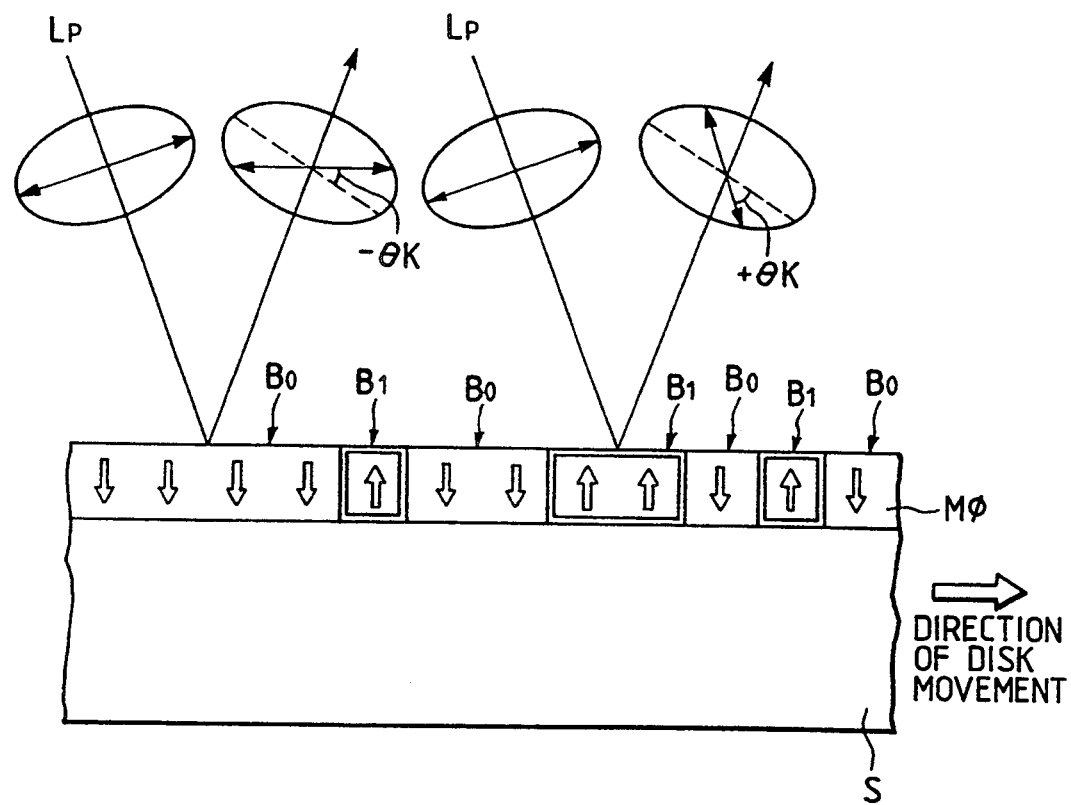
FIG. 2 is a schematic view for explaining the principle of reproduction of the magneto-optical recording system.
Figure 3:
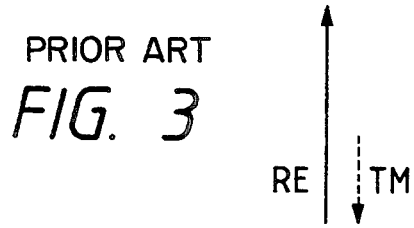
FIG. 3 is an explanatory view for comparing a vector (solid arrow) representing sublattice magnetization of a rare earth (RE) atom and a vector (dotted arrow) representing sublattice magnetization of a transition metal (TM) atom.
Figure 4:
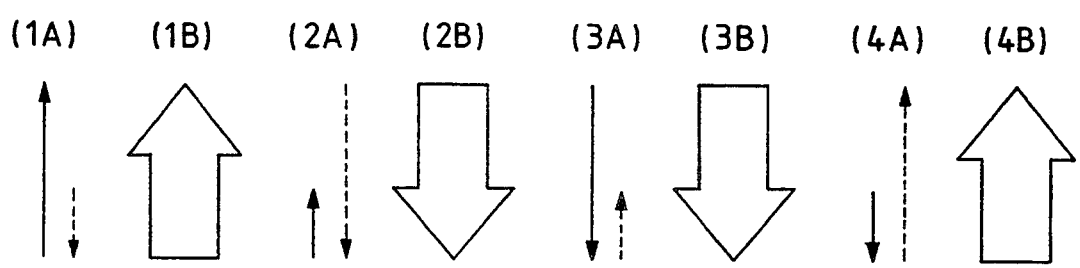
FIG. 4 is a explanatory view showing the relationship between the vectors (the solid arrow and the dotted arrow) of sublattice magnetization and a vector (hollow arrow) indicating the direction of magnetization of an alloy.
Figure 5:
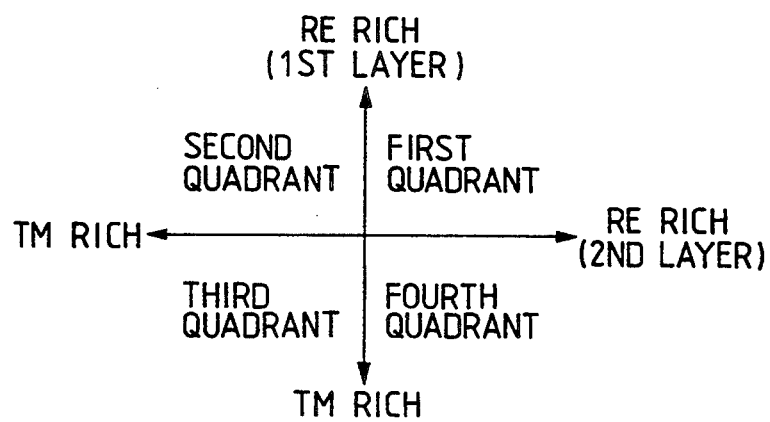
FIG. 5 is an explanatory view for explaining four classifications (first to fourth quadrants) of a two-layered film when first and second magnetic layers are t respectively classified to RE and TM rich layers.
Figure 7:
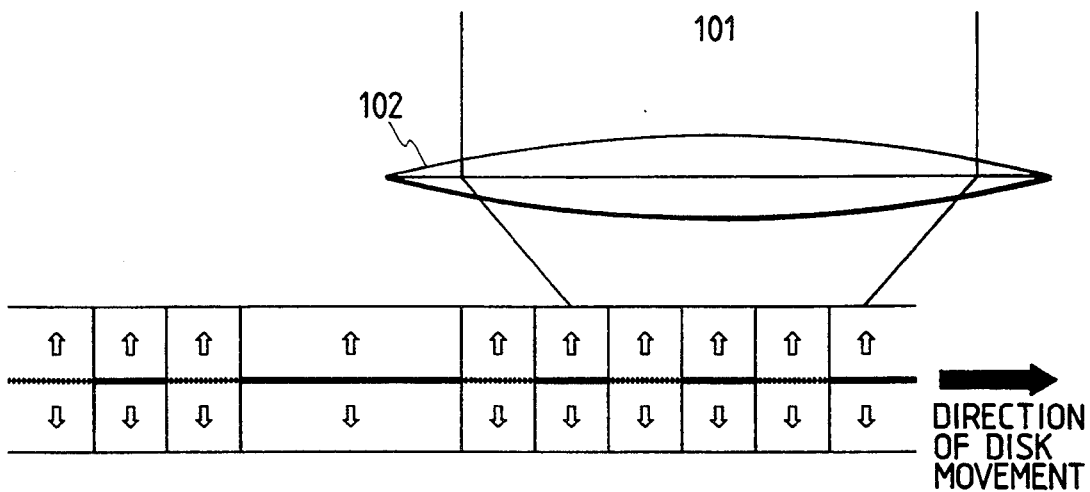
FIG. 7 is a perpendicular sectional view showing a laser beam radiation state of the disk of the first type.
Figure 8:
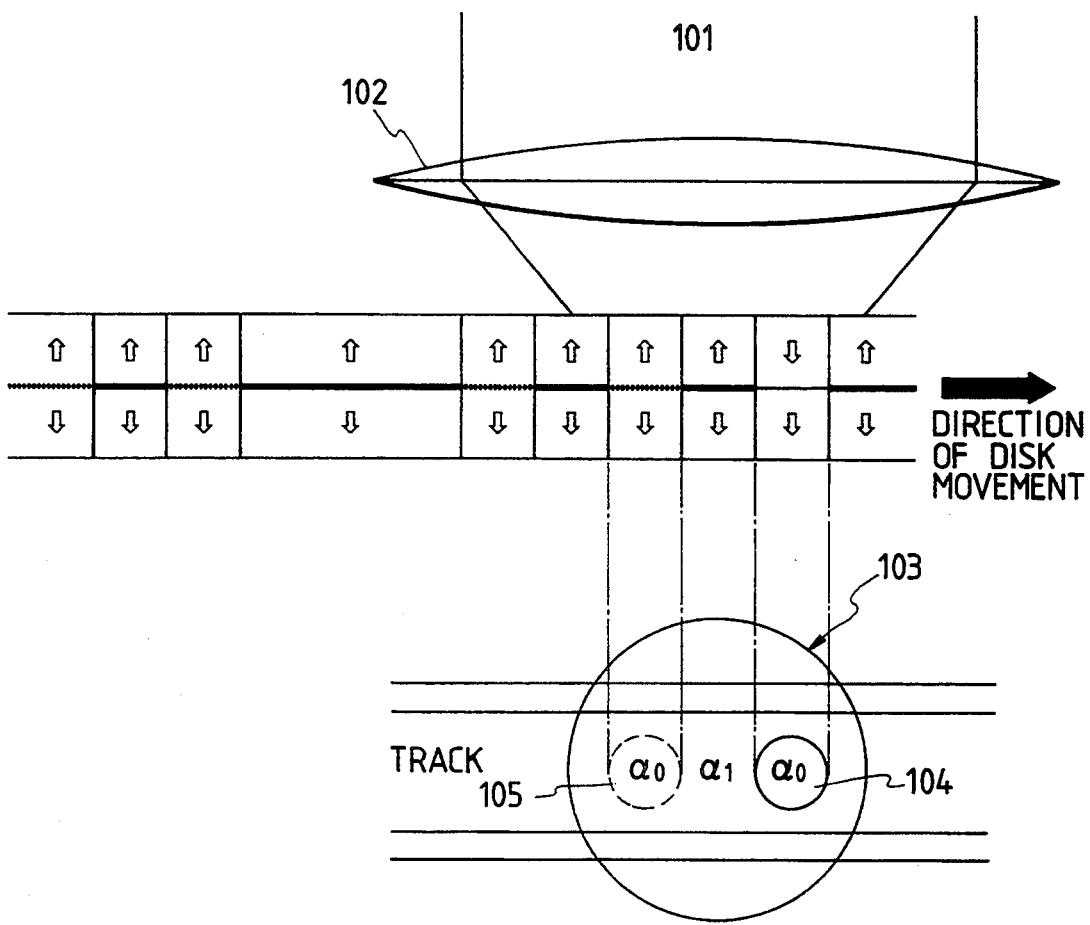
FIG. 8 is a schematic view showing the perpendicular section and the upper surface of the disk upon radiation of a laser beam.
Figure 9A:
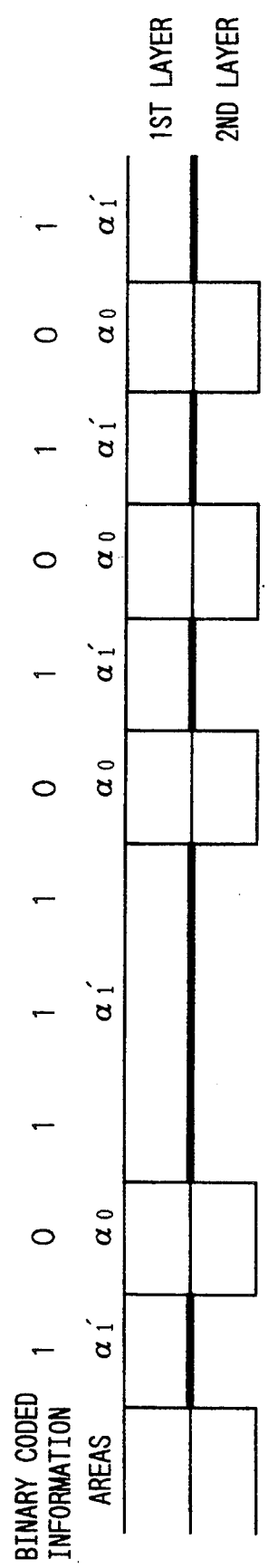
FIGS. 9A to 9C are perpendicular sectional views showing the alignment states of directions of magnetization of a disk of the second type according to the present invention.
Figure 9B:
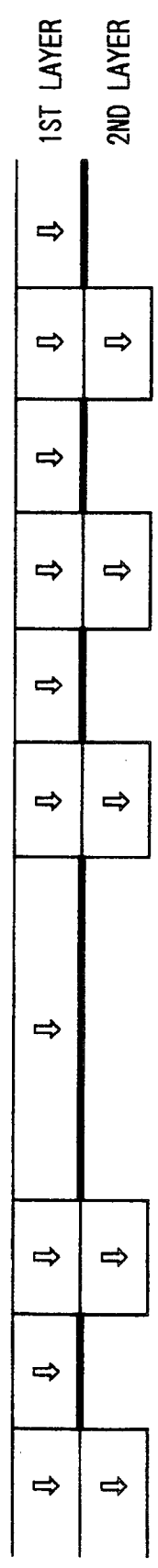
Figure 9C:
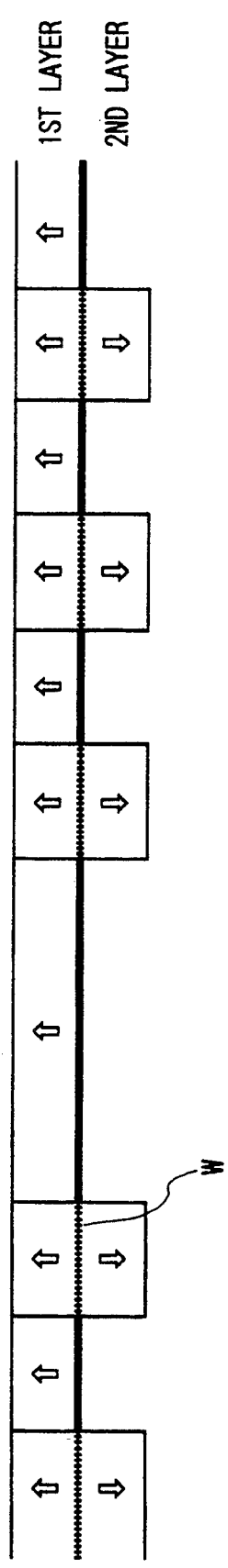
Figure 10:
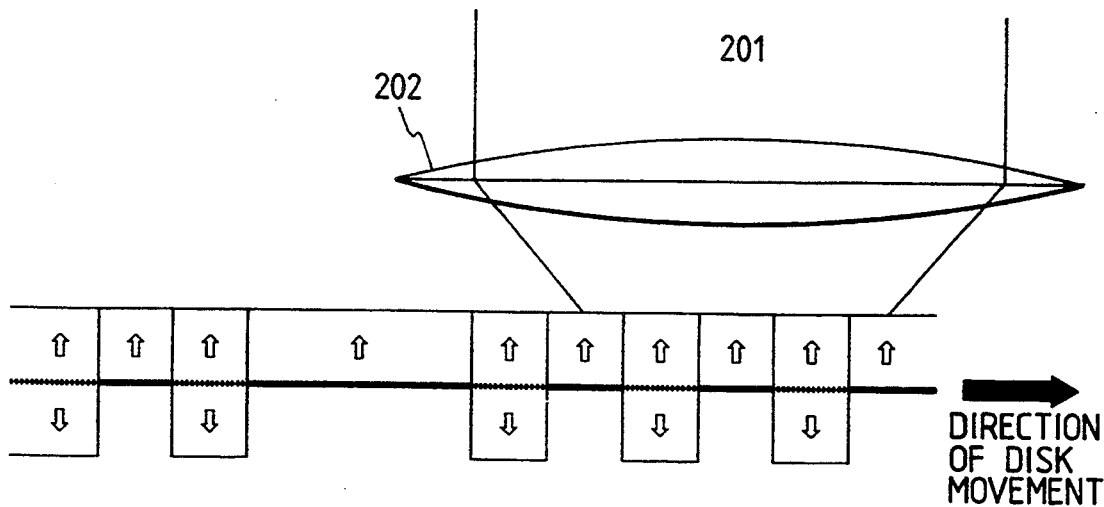
FIG. 10 is a perpendicular sectional view showing a laser beam radiation state of the disk of the second type.
Figure 11:
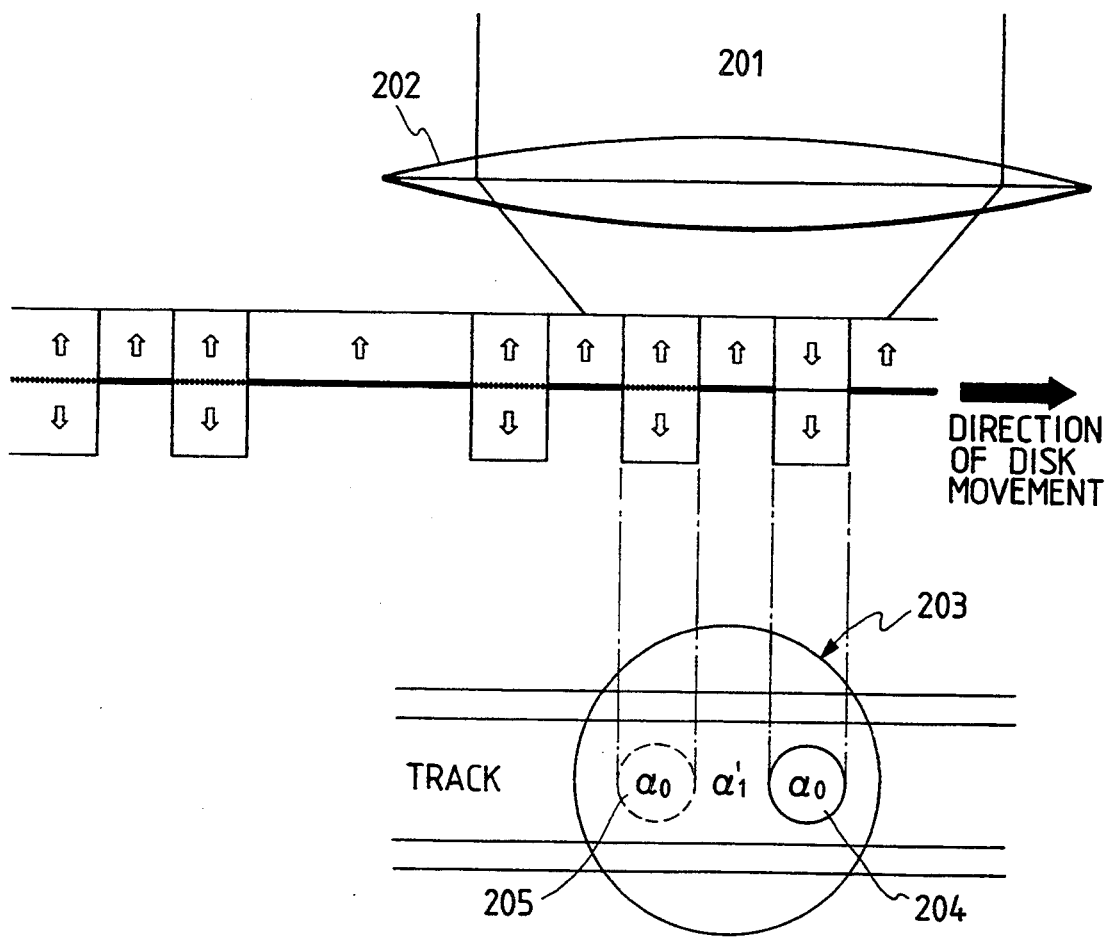
FIG. 11 is a schematic view showing the perpendicular section and the upper surface of the disk upon radiation of a laser beam.
Figure 12A:
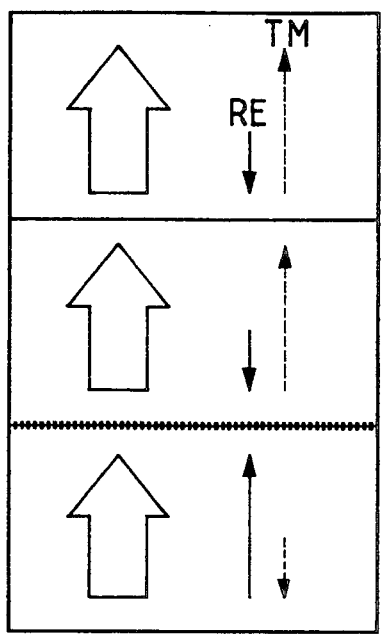
FIGS. 12A and 12B are schematic views showing the perpendicular section of an "area $\alpha_0$ where an exchange coupling force acts" of a disk according to the first embodiment, and for explaining states of magnetization and sublattice magnetization.

The disk of the first embodiment is set in the apparatus of the second embodiment, and is rotated at 1,800 rpm. When a given portion of the disk passes near the $H_{ex1}$ applying means, the directions of magnetization of the third, first, and second magnetic layers are aligned in the "A direction" ↓ upon reception of the magnetic field of 10 kOe. FIG. 12A shows this state of an area $\alpha_0$ where an exchange coupling force acts.

At this time, since both the third and first magnetic layers have TM rich compositions, the directions of TM sublattice magnetization of these layers are aligned in the "A direction" ↑. The directions of RE sublattice magnetization of these layers are aligned in the "non-A direction" ↓. Since the directions of TM sublattice magnetization of the two layers coincide with each other (are parallel to each other), no interface magnetic wall is formed in the area $\alpha_0$ where the exchange coupling force acts. Of course, no interface magnetic wall is present in an area $\alpha_1$ where no exchange coupling force acts.

On the other hand, since the second magnetic layer has an RE rich composition, the direction of RE sublattice magnetization of this layer is aligned in the "A direction" ↑, and the direction of TM sublattice magnetization is aligned in the "non-A direction" ↓. For this reason, since the directions of TM sublattice magnetization of the first and second magnetic layers do not coincide with each other (are anti-parallel to each other), an interface magnetic wall is formed even in the area $\alpha_0$ where the exchange coupling force acts. In FIG. 12A, an interface magnetic wall is indicated by a bold dotted line.

The pre-processed disk reaches the radiation position of the laser beam (linearly polarized light) after a while. At the radiation position, a beam is radiated from the side of the third magnetic layer. The temperature of the radiated portion of the disk is immediately increased, and the magnetization of the first magnetic layer is decreased. Then, the temperature of the magnetic layer of the portion which entered the beam spot (spot size: 1.3 μm) first reaches $T_R$. As a result, in the area $\alpha_0$ where the exchange coupling force acts, the first magnetic layer receives a strong exchange coupling force from the second magnetic layer. The exchange coupling force acts to cause the direction of TM sublattice magnetization of the first magnetic layer to coincide with that ("non-A direction" ↓) of the second magnetic layer. With this force, the direction of TM sublattice magnetization of the first magnetic layer in the area $\alpha_0$ is reversed, and the interface magnetic wall disappears. Since the first magnetic layer has a TM rich composition, the direction of magnetization of the entire layer is also reversed to the "non-A direction" ↓. At this time, the first magnetic layer also receives the "non-A directed" ↓ auxiliary field. Thus, reversal of the direction of magnetization of the first magnetic layer and disappearance of the interface magnetic wall occur more easily. Of course, these phenomena do not occur in the area $\alpha_I$ where no exchange coupling force acts.

Figure 12B:
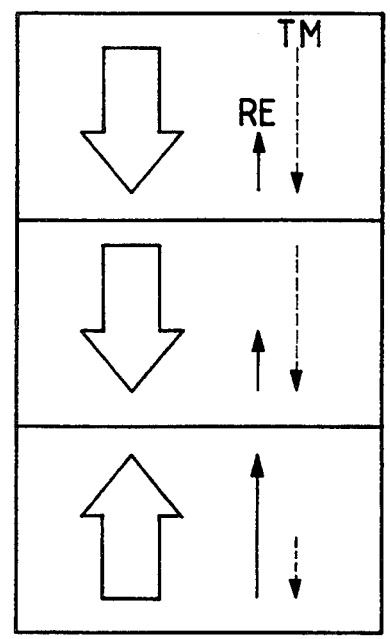

On the other hand, the third magnetic layer is exchange-coupled to the first magnetic layer. For this reason, when the direction of magnetization of the first magnetic layer is reversed to the "non-A direction" ↓ in the area $\alpha_0$, that of the third layer is also reversed. This state is shown in FIG. 12B.

Information was actually reproduced by processing the beam reflected by the third magnetic layer by the magneto-optical processing means, and its C/N ratio was measured. In this case, the spot includes two areas $\alpha_0$ of the disk of the first embodiment.

Figure 13:
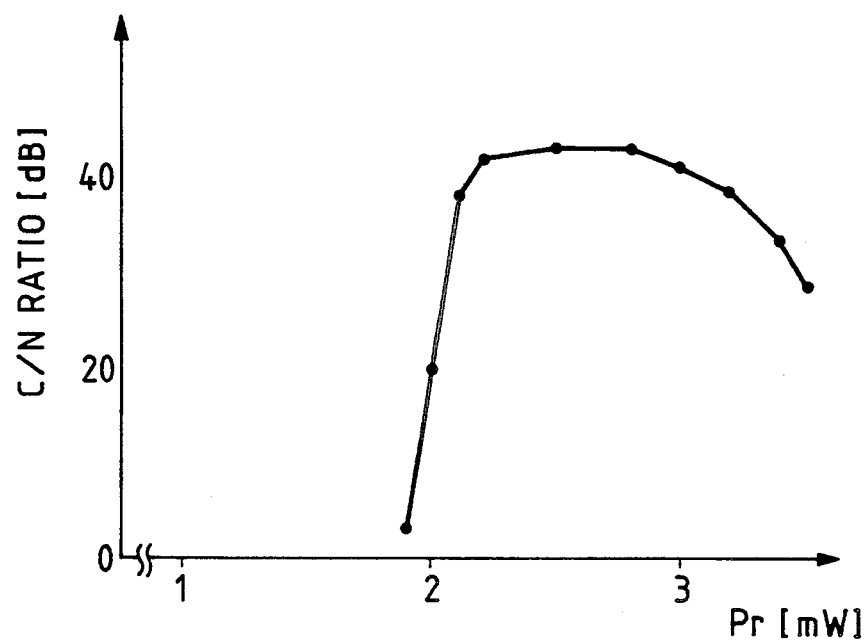
FIG. 13 is a graph showing a C/N ratio measured in the third embodiment.

The above-mentioned measurement of the C/N ratio was repeated while changing an intensity $P_R$ of the laser beam. FIG. 13 shows the measurement results. As a result, a reproduction signal appeared first at $P_R=2.0$ mW or higher, and the C/N ratio was lowered at $P_R=3.0$ mW or higher. These facts lead to the following conclusions. That is, when 2.0 mW$\leq P_R<3.0$ mW, the directions of magnetization of the third and first magnetic layers are reversed in only one area $a_0$, and when $P_R = 3.0$ mW, the temperature of the entire magnetic layers in the spot reaches the temperature $T_R$, and hence, the directions of magnetization are reversed in both the two areas $a_0$ in the spot.

Fourth Embodiment . . . Anti-parallel Type Disk II

Figure 17:
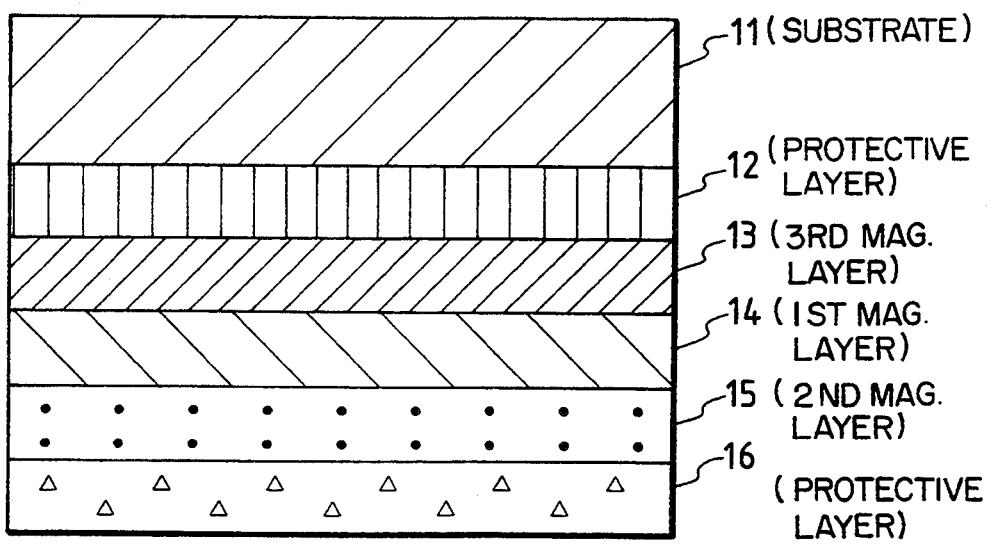
FIG. 17 is a sectional view showing the layer structure of the disk of the fourth embodiment.

FIG. 17 illustrates the layer structure of the disk.

(1) A 2P substrate 11 on which a large number of spiral grooves laving a depth h of 700 Å are formed at a pitch of 1.6 μm is prepared. The diameter of the 2P substrate is 130 mm.

(2) An RF magnetron sputtering apparatus is provided, and the 2P substrate 11 and various targets are set in a chamber of this apparatus. After the interior of the chamber is temporarily evacuated to a vacuum of $7 \times 10^{-7}$ Torr or less, Ar gas is supplied to the chamber to $5 \times 10^{-3}$ Torr. First, an Si target is used, and $N_2$ gas is supplied to the chamber in addition to the Ar gas. Then, reactive sputtering is performed to form a 700-Å thick silicon nitride film (first protective layer 12) on a resin layer. Then, $N_2$ gas supply is stopped, and sputtering is performed using a GdFeCo-based alloy target in an Ar gas atmosphere of $5 \times 10^{-3}$ Torr. With this sputtering, a third magnetic layer 13 consisting of a GdFeCo-based perpendicular magnetic film is formed on the first protective layer 12. The third magnetic layer 13 has a film thickness t of 300 Å, a TM rich composition, a coercivity $H_C$ of 100 Oe, and a Curie temperature of 400° C. or higher.

The alloy target is replaced with a DyFeCo-based alloy target while maintaining the vacuum state, and sputtering is performed. Thus, a first magnetic layer 14 consisting of a DyFeCo-based perpendicular magnetic film is formed on the third magnetic layer 13. The first magnetic layer 14 has a film thickness $t_1$ of 250 Å, a TM rich composition, a coercivity $H_{C1}$ of 1,500 Oe, and a Curie temperature of 180° C.

Then, sputtering is performed using a TbDyFeCo-based alloy target, thereby forming a second magnetic layer 15 consisting of a TbDyFeCo-based perpendicular magnetic film on the first magnetic layer 14. The second magnetic layer 15 has a film thickness $t_2$ of 350 Å, an RE rich composition, a coercivity $H_{C2}$ of 4,000 Oe, and a Curie temperature of 320° C.

The Si target is used again, and $N_2$ gas is supplied to the chamber in addition to the Ar gas. Reactive sputtering is performed to form a 500-Å thick silicon nitride film (protective layer) on the second magnetic layer 15. After the obtained intermediate product is removed from the sputtering apparatus, a photoresist is coated on the protective layer using a spin coater. After pre-baking, an excimer laser ($\lambda = 248$ nm) is radiated onto the photoresist while rotating the intermediate product. The laser is modulated by a predetermined frequency (standard information). After development and post-baking, a predetermined resist pattern is obtained. The pattern includes resist islands (similar to pits) scattered along the tracks. One island has a width of 0.3 μm and a length of 0.3 μm. The interval between adjacent islands in the moving direction of the disk is 0.3 μm. Then, dry etching is performed using Ar plasma. With this etching, the protective layer and the second magnetic layer other than the islands are removed.

The intermediate product obtained as described above is set in the sputtering apparatus again. After the interior of the chamber is temporarily evacuated to a vacuum of $7 \times 10^{-7}$ Torr or less, Ar gas is supplied to the chamber to $5 \times 10^{-3}$ Torr. The Si target is used again, and $N_2$ gas is supplied to the chamber in addition to the Ar gas. Then, reactive sputtering is performed to form a 700-Å thick silicon nitride film (second protective layer 16) on the pattern. In this manner, the disk of this embodiment is obtained. In this disk, a minimum area $a'_1$ where no second magnetic layer is formed, and no exchange coupling force acts has a length of 0.3 μm.

Fifth Embodiment . . . Reproduction Apparatus

Since the arrangement of the apparatus is the same as that of the apparatus of the second embodiment, its illustration is omitted.

This apparatus is for an anti-parallel type disk, and mainly comprises a disk rotating means, a first external field $H_{ex1}$ applying means, a laser beam light source located at the downstream side of the $H_{ex1}$ applying means, an auxiliary field applying means located at the side opposite to the light source, and a magnetooptical processing means located at the same side as the light source.

The first external field $H_{ex1}$ applying means comprises a permanent magnet for outputting an "A-directed" ↑ magnetic field of 10 kOe (on the disk surface). The auxiliary field applying means comprises a permanent magnet for outputting a "non-A-directed" ↓ magnetic field of 300 Oe (on the disk surface). The light source comprises a semiconductor laser having $\lambda = 780$ nm and a numerical aperture (NA)=0.55. The magneto-optical processing means comprises a (polarizing or non-polarizing) beam splitter, an analyzer, and a detector, which are arranged between the light source and the disk. The disk is rotated by the rotating means, and is applied with the field $H_{ex1}$. Thus, the pre-process is completed. Then, a laser beam is radiated. The beam output from the light source is transmitted through (or reflected by) the beam splitter, is incident on the disk, and is reflected by the disk. The reflected light is reflected by (or transmitted through) the beam splitter, and propagates toward the analyzer and the detector. The analyzer may be a polarization beam splitter. In this case, light including information is output while being divided into two components. The output light components are converted into electrical signals by detectors prepared in correspondence with the two light components. A difference between the two converted electrical signals is calculated to obtain a signal having a high C/N ratio.

In an apparatus for a parallel type disk, a second external field $H_{ex2}$ applying means is added between the $H_{ex1}$ applying means and the light source.

Sixth Embodiment . . . Reproduction Method

Figure 14A:
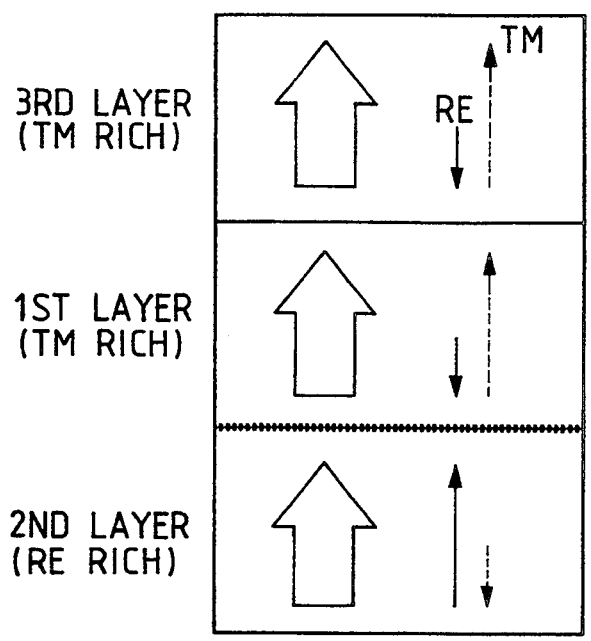
FIGS. 14A and 14B are schematic views showing the perpendicular section of an "area $\alpha_0$ where an exchange coupling force acts" of a disk according to the fourth embodiment, and for explaining states of magnetization and sublattice magnetization.

The disk of the fourth embodiment is set in the apparatus of the fifth embodiment, and is rotated at 1,800 rpm. When a given portion of the disk passes near the $H_{ex1}$ applying means, the directions of magnetization of the third, first, and second magnetic layers are aligned in the "A direction" ↑ upon reception of the magnetic field of 10 kOe. FIG. 14A shows this state of an area $a_0$ where an exchange coupling force acts. At this time, since both the third and first magnetic layers have TM rich compositions, the directions of TM sublattice magnetization of these layers are aligned in the "A direction" ↑. On the contrary, the directions of RE sublattice magnetization of these layers are aligned in the "non-A direction" ↓. Since the directions of TM sublattice magnetization of the two layers coincide with each other (are parallel to each other), no interface magnetic wall is formed in the area $\alpha_0$ where the exchange coupling force acts. Of course, no interface magnetic wall is present in an area $\alpha'_1$ where no exchange coupling force acts since no second magnetic layer is formed. On the other hand, since the second magnetic layer has an RE rich composition, the direction of RE sublattice magnetization of this layer is aligned in the "A direction" ↑, and the direction of TM sublattice magnetization is aligned in the "non-A direction" ↓. For this reason, since the directions of TM sublattice magnetization of the first and second magnetic layers do not coincide with each other (are antiparallel to each other), an interface magnetic wall is formed in the area $\alpha_0$ where the exchange coupling force acts.

In FIG. 14A, an interface magnetic wall is indicated by a bold dotted line.

Figure 14B:
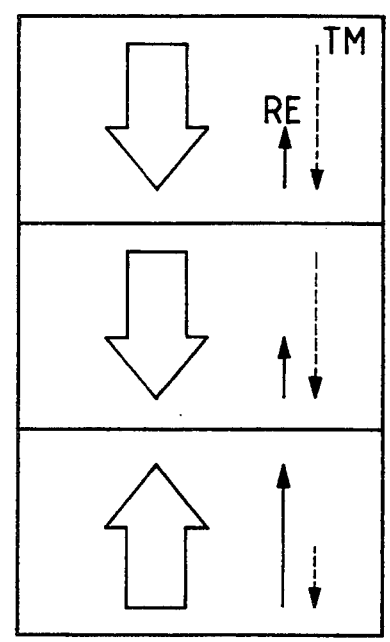
Figure 15:
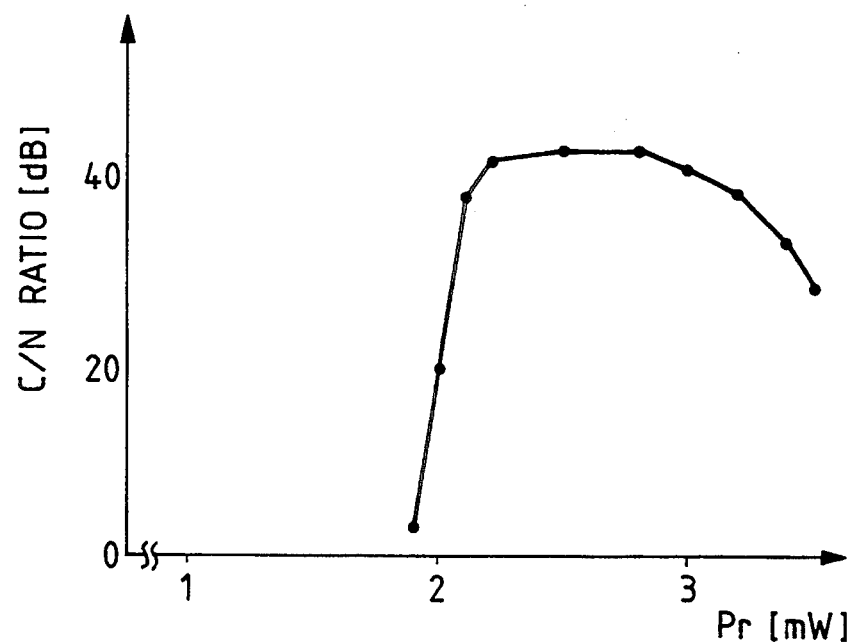
FIG. 15 is a graph showing a C/N ratio measured in the sixth embodiment.

The pre-processed disk reaches the radiation position of the laser beam (linearly polarized light) after a while. At the radiation position, a beam is radiated from the side of the third magnetic layer. The temperature of the radiated portion of the disk is immediately increased, and the magnetization of the first magnetic layer is decreased. Then, the temperature of the magnetic layer of the portion which entered the beam spot (spot size=1.3 μm) first reaches $T_R$. As a result, in the area $\alpha_0$ where the second magnetic layer is formed and the exchange coupling force acts, the first magnetic layer receives a strong exchange coupling force from the second magnetic layer. The exchange coupling force acts to cause the direction of TM sublattice magnetization of the first magnetic layer to coincide with that ("non-A direction" ↓) of the second magnetic layer. With this force, the direction of TM sublattice magnetization of the first magnetic layer is reversed and the interface magnetic wall disappears in the area $\alpha_0$. Since the first magnetic layer has a TM rich composition, the direction of magnetization of the entire layer is also reversed to the "non-A direction" ↓. At this time, the first magnetic layer also receives the "non-A directed" ↓ auxiliary field. Thus, reversal of the direction of magnetization of the first magnetic layer and disappearance of the interface magnetic wall occur more easily. Of course, these phenomena do not occur in the area $\alpha'_1$ where no second magnetic layer is formed and no exchange coupling force acts. On the other hand, the third magnetic layer is exchange-coupled to the first magnetic layer. For this reason, when the direction of magnetization of the first magnetic layer is reversed to the "non-A direction" ↓ in the area $\alpha_0$, that of the third layer is also reversed. This state is shown in FIG. 14B. Information was actually reproduced by processing the beam reflected by the third magnetic layer by the magneto-optical processing means, and its C/N ratio was measured. In this case, the spot includes two areas $\alpha_0$ of the disk of the fourth embodiment. The above-mentioned measurement of the C/N ratio was repeated while changing an intensity $P_R$ of the laser beam. FIG. 15 shows the measurement results. As a result, a reproduction signal appeared first at $P_R=2.0$ mW or higher, and the C/N ratio was lowered at $P_R=3.0$ mW or higher. These facts lead to the following conclusions. That is, when $2.0\ \text{mW} \leq P_R < 3.0\ \text{mW}$, the directions of magnetization of the third and first magnetic layers are reversed in only one area $\alpha_0$, and when $P_R=3.0$ mW, the temperature of the entire magnetic layers in the spot reaches the temperature $T_R$, and hence, the directions of magnetization are reversed in both the two areas $\alpha_0$ in the spot.

What is claimed is:

1. A reproduction-only magneto-optical disk having first and second magnetic layers stacked on a substrate, comprising:

first micro areas $\alpha_0$ where an exchange coupling force acts between said first and second magnetic layers; and second micro areas $\alpha_1$ where no exchange coupling force acts between said first and second magnetic layers, wherein at least one of said two kinds of micro areas serve as information units, and information is expressed by the presence/absence or length of the information units, and wherein said first and second magnetic layers are exchange-coupled to each other at a temperature not more than Curie Temperatures of the two layers, and directions of magnetization of the two magnetic layers can be aligned at room temperature in a state wherein an interface magnetic wall is formed between said first and second magnetic layers in each of said first micro areas.

2. A magneto-optical disk according to claim 1, wherein both said first and second magnetic layers have perpendicular magnetic anisotropy.

3. A magneto-optical disk according to claim 1, further comprising a third magnetic layer formed adjacent to one of said first and second magnetic layers to be exchange-coupled thereto, and having a larger Kerr rotation angle.

4. A magneto-optical disk according to claim 3, wherein a Curie temperature of said third magnetic layer is higher than the Curie temperature of said first magnetic layer.

5. A magneto-optical disk according to claim 1, wherein said disk has, in the second micro areas $\alpha_1$, an exchange coupling force shielding layer, formed between said first and second magnetic layers, for shielding an exchange coupling force between said first and second magnetic layers.

6. A magneto-optical disk according to claim 1, wherein a minimum length of at least one of said two kinds of micro areas is smaller than a wavelength of a reproduction laser beam.

7. A reproduction-only magneto-optical disk having first and second magnetic layers stacked on a substrate, said first and second magnetic layers being exchange-coupled to each other at a temperature not more than Curie temperatures of the two layers, and directions of magnetization of said first and second magnetic layers being able to be aligned at room temperature in a state wherein an interface magnetic wall is formed between said first and second magnetic layers, said disk comprising:

first micro areas $\alpha_0$ where said second magnetic layer is present; and second micro areas $\alpha'_1$ where said second magnetic layer is not present, wherein at least one of said two kinds of micro areas serve as information units, and information is expressed by the presence/absence or length of the information units.

8. A magneto-optical disk according to claim 7, wherein both said first and second magnetic layers have perpendicular magnetic anisotropy.

9. A magneto-optical disk according to claim 7, further comprising a third magnetic layer formed adjacent to said first magnetic layer on a side opposite to said second magnetic layer to be exchange-coupled to said first magnetic layer, and having a larger Kerr rotation angle.

10. A magneto-optical disk according to claim 9, wherein a Curie temperature of said third magnetic layer is higher than the Curie temperature of said first magnetic layer.

11. A magneto-optical reproduction method, comprising the steps of:
providing a reproduction-only magneto-optical disk having first and second magnetic layers stacked on a substrate, including first micro areas $\alpha_0$ where an exchange coupling force acts between said first and second magnetic layers and second micro areas $\alpha_1$ where no exchange coupling force acts between said first and second magnetic layers, wherein at least one of said two kinds of micro areas serve as information units, and information is expressed by the presence/absence or length of the information units, and wherein said first and second magnetic layers are exchange-coupled to each other at a temperature not more than Curie temperatures of the two layers, and directions of magnetization of the two magnetic layers can be aligned at room temperature in a state wherein an interface magnetic wall is formed between said first and second magnetic layers in each of said first micro areas;
executing a pre-process to attain a state wherein a direction of magnetization of said first magnetic layer is aligned, a direction of magnetization of said second magnetic layer is also aligned, and in at least a first micro area $\alpha_0$ to be subjected to reproduction, an interface magnetic wall is formed between said first and second magnetic layers;
rotating the disk;
radiating a laser beam onto the disk to increase temperatures of said first and second magnetic layers in a portion of said disk to a temperature at which the interface magnetic wall present between said first and second magnetic layers disappears, and the magnetizations of said first and second magnetic layers do not disappear; and
magneto-optically processing light of the laser beam reflected by or transmitted through said disk to convert the light into an electrical signal.

12. A reproduction method according to claim 11, wherein a spot size of the laser beam on said disk is larger than a minimum size of at least one of said two kinds of micro area of said disk.

13. A magneto-optical reproduction method, comprising the steps of:
providing a reproduction-only magneto-optical disk having first and second magnetic layers stacked on a substrate, said first and second magnetic layers being exchange-coupled to each other at a temperature not more than Curie temperatures of the two layers, and directions of magnetization of said first and second magnetic layers being able to be aligned at room temperature in a state wherein an interface magnetic wall is formed between said first and second magnetic layers, said disk including first micro areas $\alpha_0$ where said second magnetic layer is present and second micro areas $\alpha'_1$ where said second magnetic layer is not present, wherein at least one of said two kinds of micro areas serve as information units, and information is expressed by the presence/absence or length of the information units;
aligning directions of magnetization of said first and second magnetic layers;
rotating the disk;
radiating a laser beam onto said disk to increase temperatures of said first and second magnetic layers in a portion of said disk to a temperature at which a direction of magnetization of a first micro area $\alpha_0$ is reversed, and a direction of magnetization of a second micro area $\alpha'_1$ is not reversed; and
magneto-optically processing light of the laser beam reflected by or transmitted through said disk to convert the light into an electrical signal.

14. A reproduction method according to claim 13, wherein a spot size of the laser beam on said disk is larger than a minimum size of at least one of said two kinds of micro area of said disk.

15. A magneto-optical reproduction apparatus for reproducing information from a parallel type magneto-optical disk of one of the following kinds (i) and (ii):
(i) a reproduction-only magneto-optical disk having first and second magnetic layers stacked on a substrate, including first micro areas $\alpha_0$ where an exchange coupling force acts between said first and second magnetic layers and second micro areas $\alpha_1$ where no exchange coupling force acts between said first and second magnetic layers, wherein at least on of said two kinds of micro areas serve as information units, and information is expressed by the presence/absence or length of the information units, and wherein said first and second magnetic layers are exchange-coupled to each other at a temperature not more than Curie temperatures of the two layers, and directions of magnetization of the two magnetic layers can be aligned at room temperature in a state wherein an interface magnetic wall is formed between said first and second magnetic layers in each of said first micro areas;
(ii) a reproduction-only magneto-optical disk having first and second magnetic layers stacked on a substrate, said first and second magnetic layers being exchange-coupled to each other at a temperature not more than Curie temperatures of the two layers, and directions of magnetization of said first and second magnetic layers being able to be aligned at room temperature in a state wherein an interface magnetic wall is formed between said first and second magnetic layers, the disk including first micro areas $\alpha_0$ where said second magnetic layer is present and second micro areas $\alpha'_1$ where said second magnetic layer is not present, wherein at least one of said two kinds of micro areas serve as information units, and information is expressed by the presence/absence or length of the information units;
said apparatus comprising:
disk rotating means;
first external field applying means for applying a magnetic field for aligning directions of magnetization of said first and second magnetic layers of the disk in a state wherein no interface magnetic wall is formed between said first and second layers, before reproduction;
second external field applying means for leaving unchanged the direction of magnetization of one of said first and second magnetic layers, whose directions of magnetization are aligned by said first external field applying means, and reversing the direction of magnetization of the other of said first and second magnetic layers to form an interface magnetic wall between said first and second layers, before reproduction;

a laser beam light source for radiating the disk; and magneto-optical processing means for processing light from the disk.

16. A magneto-optical reproduction apparatus for reproducing information from a parallel type magneto-optical disk of one of the following kinds (i) and (ii):

(i) a reproduction-only magneto-optical disk having first and second magnetic layers stacked on a substrate, including first micro areas $\alpha_0$ where an exchange coupling force acts between said first and second magnetic layers and second micro areas $\alpha_1$ where no exchange coupling force acts between said first and second magnetic layers, wherein at least on of said two kinds of micro areas serve as information units, and information is expressed by the presence/absence or length of the information units, and wherein said first and second magnetic layers are exchange-coupled to each other at a temperature not more than Curie temperatures of the two layers, and directions of magnetization of the two magnetic layers can be aligned at room temperature in a state wherein an interface magnetic wall is formed between said first and second magnetic layers in each of said first micro areas;

(ii) a reproduction-only magneto-optical disk having first and second magnetic layers stacked on a substrate, said first and second magnetic layers being exchange-coupled to each other at a temperature not more than Curie temperatures of the two layers, and directions of magnetization of said first and second magnetic layers being able to be aligned at room temperature is a state wherein an interface magnetic wall is formed between said first and second magnetic layers, the disk including first micro areas $\alpha_0$ where said second magnetic layer is present and second micro areas $\alpha'_1$ where said second magnetic layer is not present, wherein at least one of said two kinds of micro areas serve as information units, and information is expressed by the presence/absence or length of the information units;

said apparatus comprising:

disk rotating means;

external field applying means for leaving unchanged the direction of magnetization of one of said first and second magnetic layers, whose directions of magnetization are aligned, and aligning the direction of magnetization of the other one of said first and second magnetic layers to form an interface magnetic wall between said first and second layers, before reproduction;

a laser beam light source for radiating the disk; and magneto-optical processing means for processing light from the disk.

17. A magneto-optical reproduction apparatus for reproducing information from an anti-parallel type magneto-optical disk of one of the following kinds (i) and (ii):

(i) a reproduction-only magneto-optical disk having first and second magnetic layers stacked on a substrate, including first micro areas $\alpha_0$ where an exchange coupling force acts between said first and second magnetic layers and second micro areas $\alpha_1$ where no exchange coupling force acts between said first and second magnetic layers, wherein at least one of said two kinds of micro areas serve as information units, and information is expressed by the presence/absence or length of the information units, and wherein said first and second magnetic layers are exchange-coupled to each other at a temperature not more than Curie temperatures of the two layers, and directions of magnetization of the two magnetic layers can be aligned at room temperature in a state wherein an interface magnetic wall is formed between said first and second magnetic layers in each of said first micro layers;

(ii) a reproduction-only magneto-optical disk having first and second magnetic layers stacked on a substrate, said first and second magnetic layers being exchange-coupled to each other at a temperature not more than Curie temperatures of the two layers, and directions of magnetization of said first and second magnetic layers being able to be aligned at room temperature in a state wherein an interface magnetic wall is formed between said first and second magnetic layers, the disk including first micro areas $\alpha_0$ where said second magnetic layer is present and second micro areas $\alpha'_1$ where said second magnetic layer is not present, wherein at least one of said two kinds of micro areas serve as information units, and information is expressed by the presence/absence or length of the information units;

said apparatus comprising:

disk rotating means;

magnetic field applying means for applying a magnetic field for respectively aligning directions of magnetization of said first and second magnetic layers of the anti-parallel type disk in a predetermined direction to form an interface magnetic wall between said first and second magnetic layers, before reproduction;

a laser beam light source for radiating the disk; and magneto-optical processing means for processing light from the disk.

18. An apparatus according to claim 15, further comprising auxiliary field applying means for applying an auxiliary field for helping to cause the interface magnetic wall present between said first and second magnetic layers to disappear at a laser beam spot position of the disk.

19. An apparatus according to claim 15, wherein a size of a laser beam spot on the disk is larger than a minimum size of a micro area of the disk.

20. An apparatus according to claim 16, further comprising auxiliary field applying means for applying an auxiliary field for helping to cause the interface magnetic wall present between said first and second magnetic layers to disappear at a laser beam spot position of the disk.

21. An apparatus according to claim 17, further comprising auxiliary field applying means for applying an auxiliary field for helping to cause the interface magnetic wall present between said first and second magnetic layers to disappear at a laser beam spot position of the disk.

22. An apparatus according to claim 16, wherein a size of a laser beam spot on said disk is larger than a minimum size of a micro area of the disk.

23. An apparatus according to claim 17, wherein a size of a laser beam spot on said disk is larger than a minimum size of a micro area of the disk.

* * * * *